(12) United States Patent
Kusagaki et al.

(10) Patent No.: US 12,134,382 B2
(45) Date of Patent: Nov. 5, 2024

(54) DRIVING SUPPORT DEVICE

(71) Applicant: Mitsubishi Electric Corporation, Tokyo (JP)

(72) Inventors: Takuma Kusagaki, Tokyo (JP); Tatsuo Fujimoto, Tokyo (JP); Nobuyoshi Tomomatsu, Tokyo (JP); Taiga Tanaka, Tokyo (JP); Tatsuji Irie, Tokyo (JP); Wataru Tsujita, Tokyo (JP); Kenzo Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/716,233

(22) Filed: Apr. 8, 2022

(65) Prior Publication Data

US 2023/0150501 A1 May 18, 2023

(30) Foreign Application Priority Data

Nov. 16, 2021 (JP) .................................. 2021-186116

(51) Int. Cl.
*B60W 30/18* (2012.01)
*B60W 50/10* (2012.01)
(Continued)

(52) U.S. Cl.
CPC ...... *B60W 30/18027* (2013.01); *B60W 50/10* (2013.01); *B62J 45/4151* (2020.02);
(Continued)

(58) Field of Classification Search
CPC ........... B60W 30/18027; B60W 50/10; B60W 2300/36; B60W 2510/0623;
(Continued)

(56) References Cited

U.S. PATENT DOCUMENTS

2003/0097712 A1* 5/2003 Gallant ................... A61G 7/08
5/620
2011/0268300 A1* 11/2011 DeMers ................... H04R 5/02
340/407.1
2014/0118855 A1 5/2014 Whinnery et al.

FOREIGN PATENT DOCUMENTS

JP 2005-051944 A 2/2005
JP 2012224232 A * 11/2012
JP 2019123474 A * 7/2019

OTHER PUBLICATIONS

Karim Nice "How Fuel Injection Systems Work" Jan. 4, 2001. HowStuffWorks.com. (Year: 2001).*

(Continued)

*Primary Examiner* — Ig T An
*Assistant Examiner* — Chase L Cooley
(74) *Attorney, Agent, or Firm* — Sughrue Mion, PLLC; Richard C. Turner

(57) ABSTRACT

The posture of the driver is detected from the driver head portion, and the detected value and the driver mounting determination value are used to determine that the driver is pushing the vehicle and obtain the vehicle pushing command value. Converts the vehicle pushing command value to the target vehicle pushing assistance vesicle speed, determines whether vehicle pushing assistance can be performed based on the driver's posture and the vehicle condition, and outputs the vehicle pushing assistance permission determination. Then, from the target vehicle pushing assistance vehicle speed and the vehicle pushing assistance permission determination, the control amount for the vehicle power source that assists the vehicle pushing is calculated and output.

16 Claims, 13 Drawing Sheets

(51) Int. Cl.
*B62J 45/415* (2020.01)
*G01S 13/06* (2006.01)
*G01S 13/68* (2006.01)

(52) U.S. Cl.
CPC .............. *G01S 13/06* (2013.01); *G01S 13/68* (2013.01); *B60W 2300/36* (2013.01); *B60W 2510/0623* (2013.01); *B60W 2540/223* (2020.02); *B60W 2710/0666* (2013.01)

(58) Field of Classification Search
CPC ..... B60W 2540/223; B60W 2710/0666; B62J 45/4151; G01S 13/06; G01S 13/68
See application file for complete search history.

(56) References Cited

OTHER PUBLICATIONS

Roberts, Glenn, The Uno—it's unique—but can it pop a wheeler?, 2008, motorcyclemojo.com, pp. 1-4 (Year: 2008).*
Communication dated Dec. 6, 2022, issued in Japanese Application No. 2021-186116.

* cited by examiner

DRIVING SUPPORT DEVICE

BACKGROUND OF THE INVENTION

Field of the Invention

The present application relates to a driving support device.

Description of the Background Art

As one aspect of a driving operation of a saddled vehicle, a case wherein a driver pushes the vehicle in order to cause the vehicle to move in a stationary state is conceivable. A saddled vehicle is structurally unable to remain erect when stationary or at low speed, meaning that in order to move the vehicle in a stationary state, the driver needs to carry out a movement of the vehicle or a handlebar operation while supporting the vehicle, and a burden on the driver is considerable.

This burden materializes still more noticeably when transporting a large vehicle or when moving on an inclined road. Furthermore, there are cases wherein pushing a vehicle is carried out by utilizing engine power when moving uphill, which is a difficult operation for a driver who is unused to a two-wheeled vehicle, as an accelerator operation is involved. Because of this, support control technology for lessening the burden on a driver when, for example, pushing a two-wheeled vehicle exists. Detecting a state wherein pushing of a vehicle can be carried out, and detecting that a driver intends to push a vehicle, are required of vehicle pushing support control.

In order to reliably detect that a driver intends to push a vehicle, disposing a two-wheeled vehicle wheel rotation sensor, or a switch in a two-wheeled vehicle seat, detecting an intention of the driver to push the vehicle using the sensor or the switch, and controlling a drive source driving force as vehicle pushing support control only when needed by the driver, has been proposed in, for example, Patent Literature 1.

Also, enabling speed adjustment via an accelerator operation by a driver as an adjustment of driving force during vehicle pushing support control, although a limit is provided to a vehicle speed, and setting a condition that the handlebar is operated with both hands in order to prevent a two-wheeled vehicle from becoming unstable and falling over during vehicle pushing support control, has been proposed in Patent Literature 2.

Patent Literature 1: JP A 2005-051944
Patent Literature 2: JP-A-2012-224232

In Patent Literature 1, a state wherein a driver is pushing a vehicle body by human power is detected by a vehicle body seat switch, and in Patent Literature 2, a state wherein a driver is pushing a vehicle is taken to be a state wherein the driver is supporting the handlebar with both hands. When pushing an actual two-wheeled vehicle, however, a posture of a driver when pushing the vehicle differs in accordance with a vehicle category, an ambient environment of the vehicle, whether a direction in which the vehicle is pushed is forward or backward, and a degree of proficiency of the driver.

Investigation by the inventor indicates that when, for example, causing a vehicle to move backward, a driver of comparatively low proficiency supports the handlebar with both hands, but a driver of high proficiency supports the handlebar with the left hand, and causes the vehicle to move while pushing a rear portion of the seat with the right hand.

Also, a portion of the seat pushed changes depending on the driver, because of which a case wherein a region in which the seat switch exists cannot be pushed by the hand also occurs. Because of this, there is concern that when a posture of the driver supporting the vehicle and a posture assumed by the vehicle pushing support control do not correspond, the driver will not be able to receive support.

Also, when adjusting vehicle speed control of the vehicle pushing support control, the difficulty of carrying out an accelerator operation while supporting the vehicle increases depending on the proficiency of the driver, and there is concern that the driver will be unable to adjust to the intended vehicle speed.

SUMMARY OF THE INVENTION

The present application discloses technology for resolving the aforementioned kinds of problem, and has an object of providing a driving support device that carries out driving operation support for a vehicle pushing that carries out a vehicle movement when the vehicle is stationary.

A driving support device disclosed in the present application is characterized by including a driver posture detecting circuitry that detects a posture of a driver based on a driver head portion position output from a driver head portion position detecting device, a vehicle pushing intention determining circuitry that determines, based on a detected value obtained by the driver posture detecting circuitry, that there is a state wherein a vehicle is being pushed by the driver, and outputs a vehicle pushing command value, a target vehicle pushing assistance vehicle speed calculating circuitry that calculates a target vehicle pushing assistance vehicle speed by converting the vehicle pushing command value, a vehicle pushing assistance permission determining circuitry that determines whether or not vehicle pushing assistance can be implemented based on the posture of the driver and a state of the vehicle, and outputs a vehicle pushing assistance permission determination, and a vehicle pushing assistance circuitry that calculates, from the target vehicle pushing assistance vehicle speed and the vehicle pushing assistance permission determination, a controlled variable for a vehicle power source that assists vehicle pushing, and outputs the controlled variable.

According to the driving support device disclosed in the present application, whether to permit vehicle pushing assistance can be determined appropriately in accordance with a driver's posture.

The foregoing and other objects, features, aspects, and advantages of the present application will become more apparent from the following detailed description of the present, application when taken in conjunction with the accompanying drawings.

Figure 3:
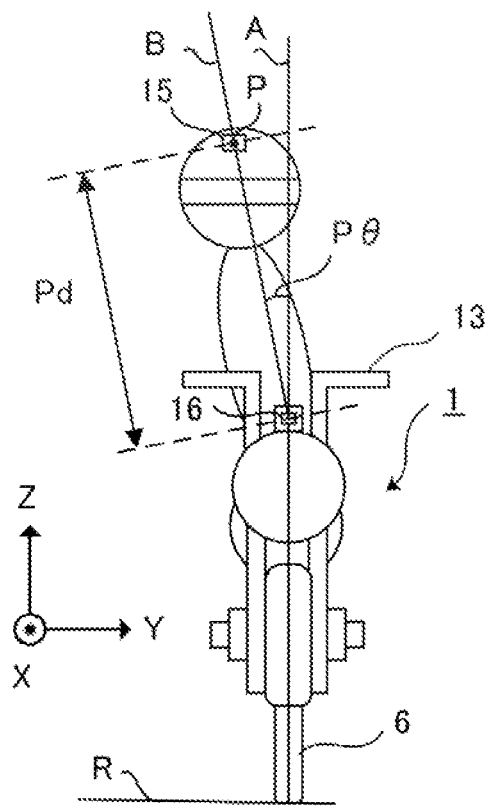
Figure 4:
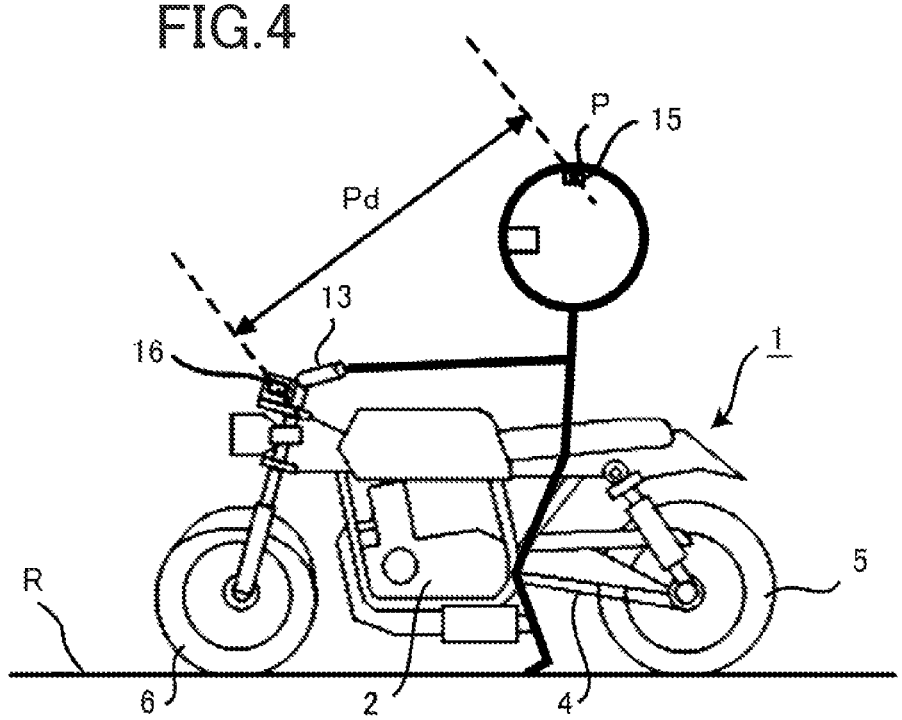
Figure 5:
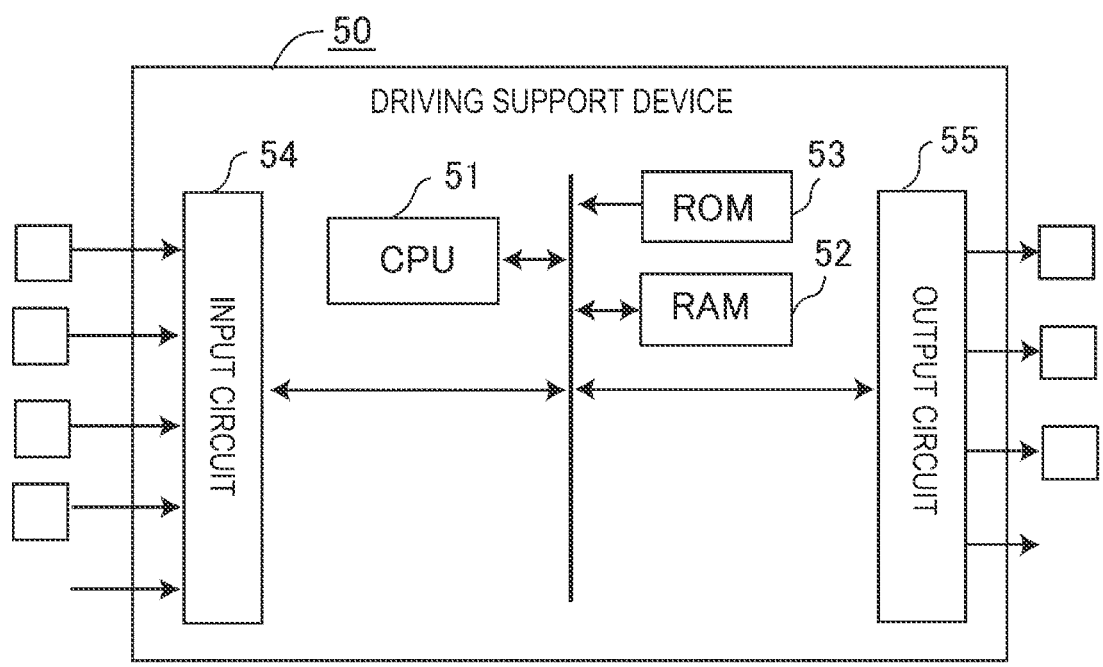
Figure 6:
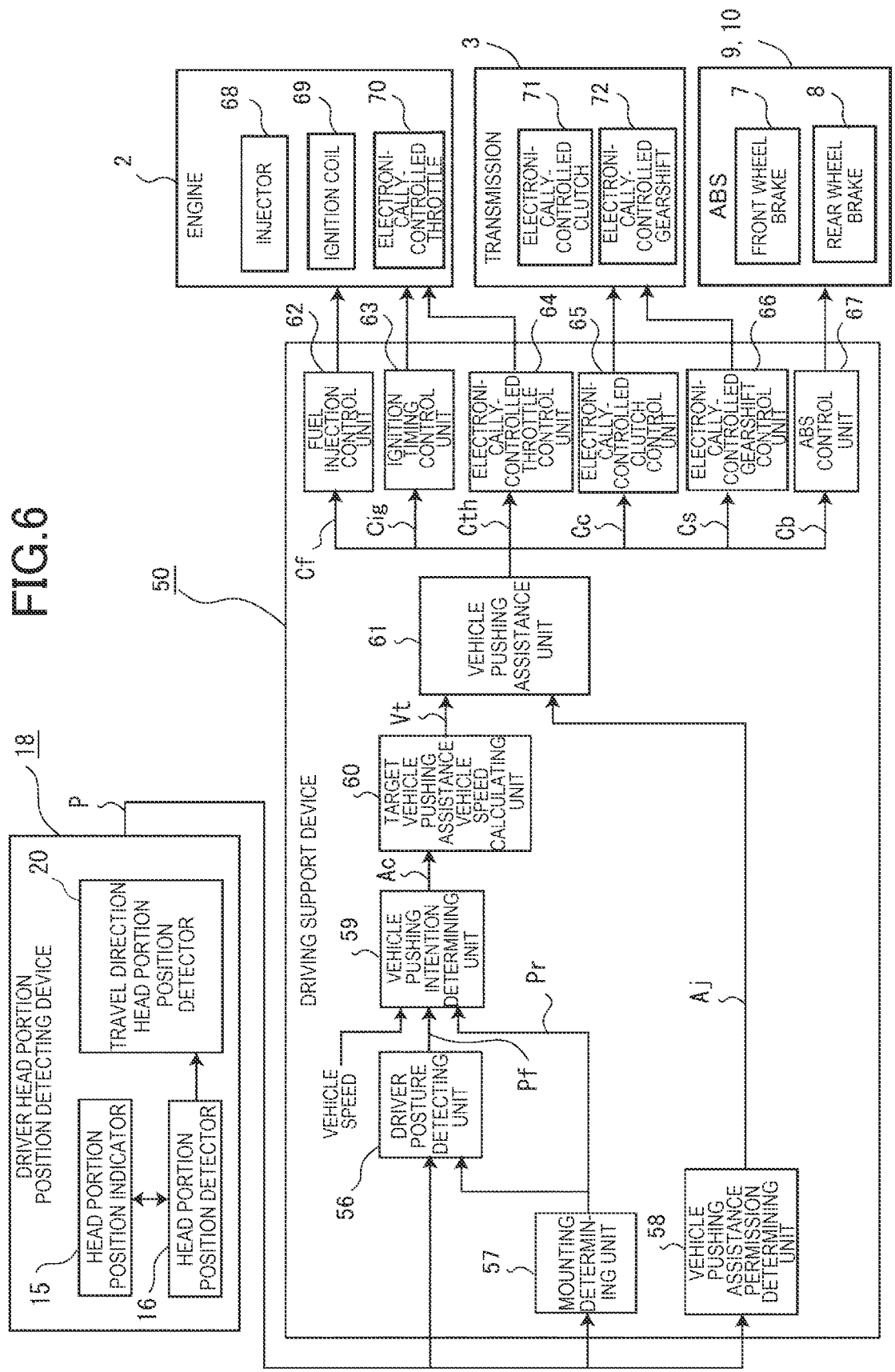
Figure 7:
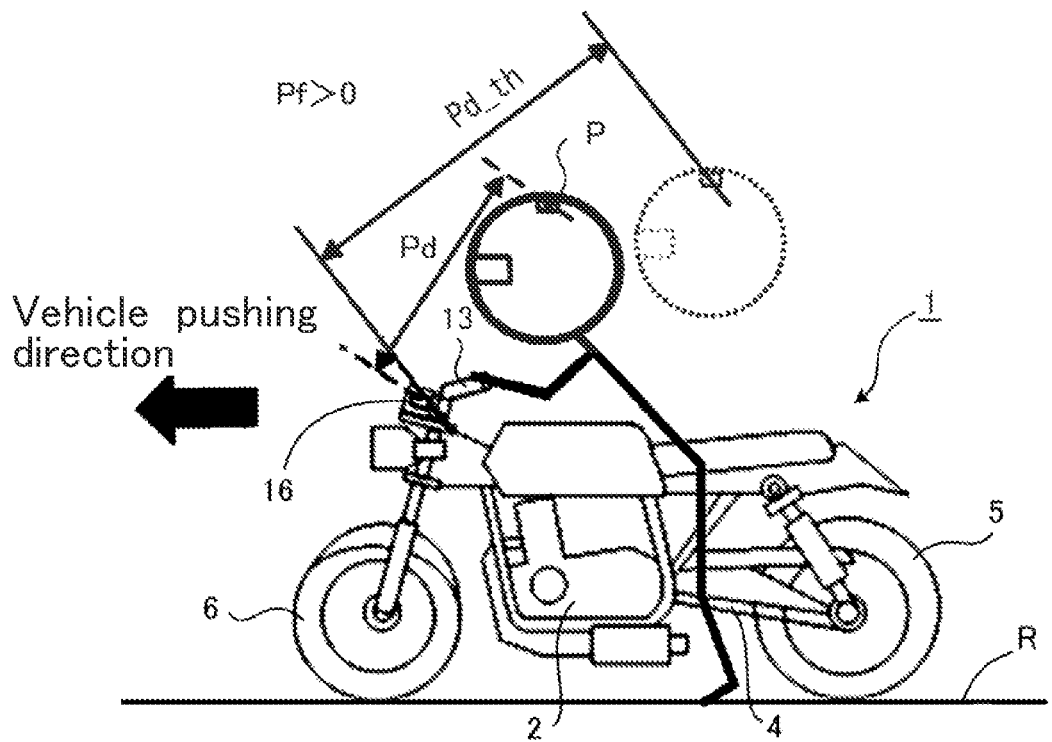
Figure 8:
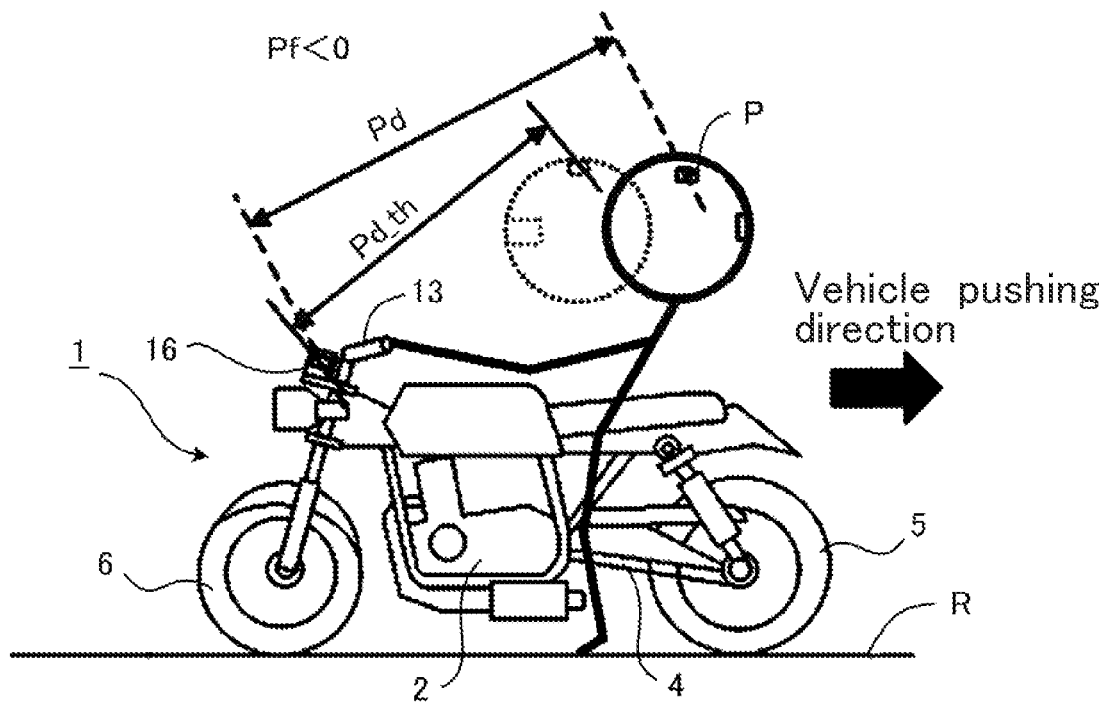
Figure 9:
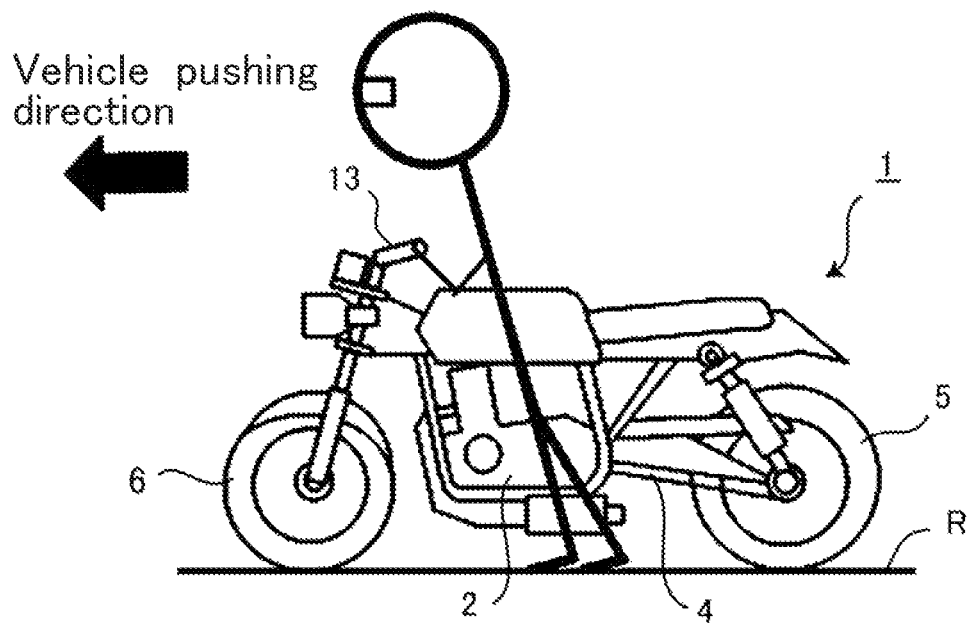
Figure 10:
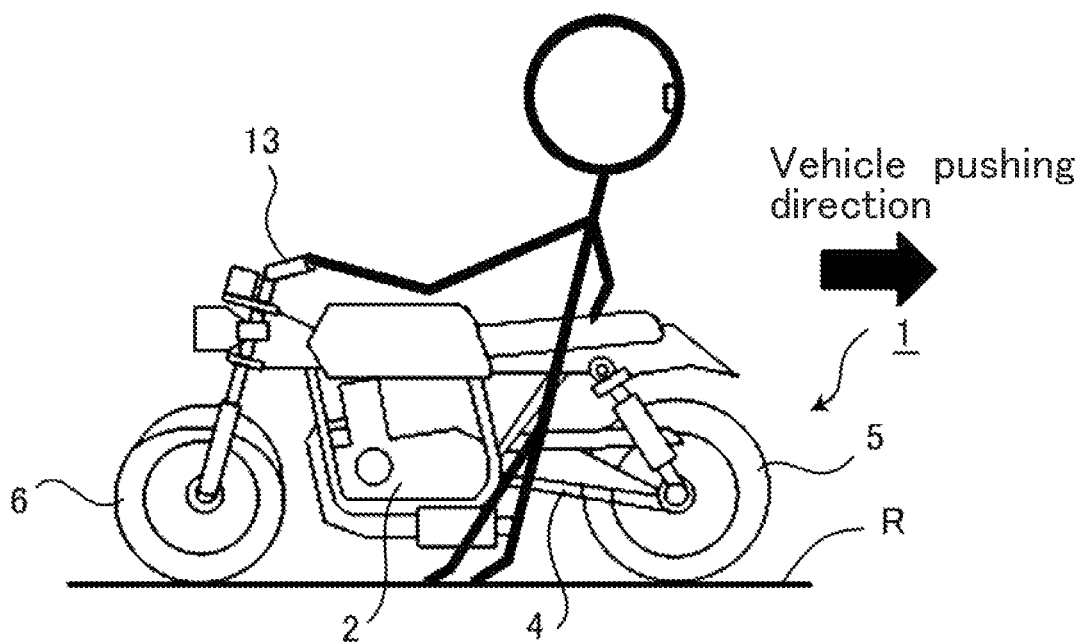
Figure 11:
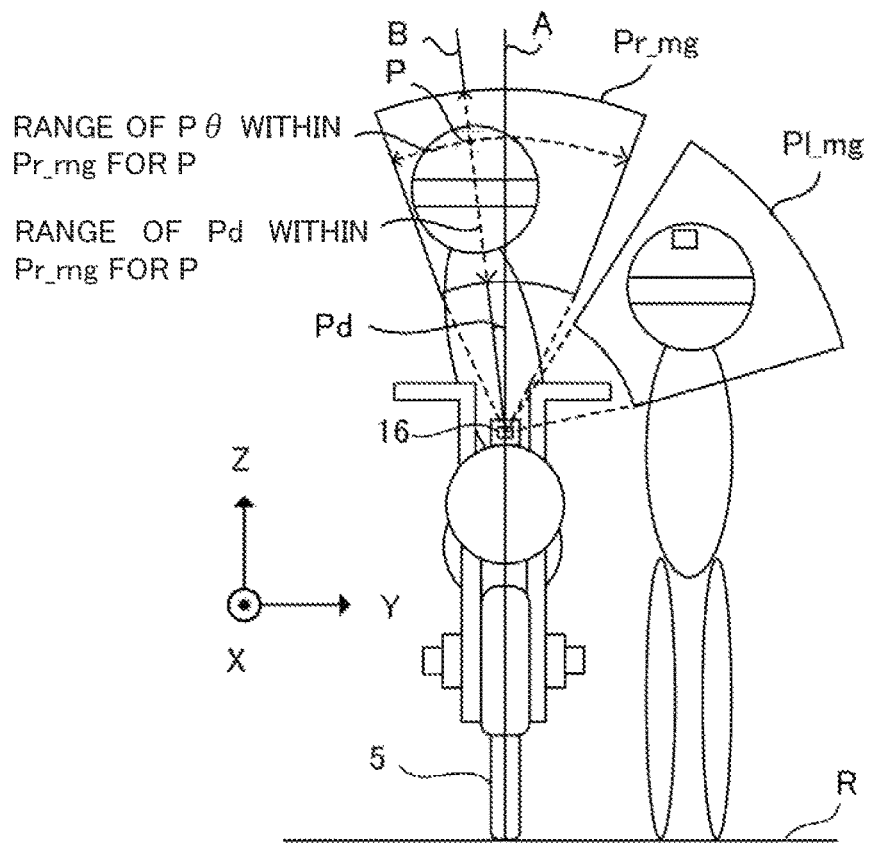
Figure 12:
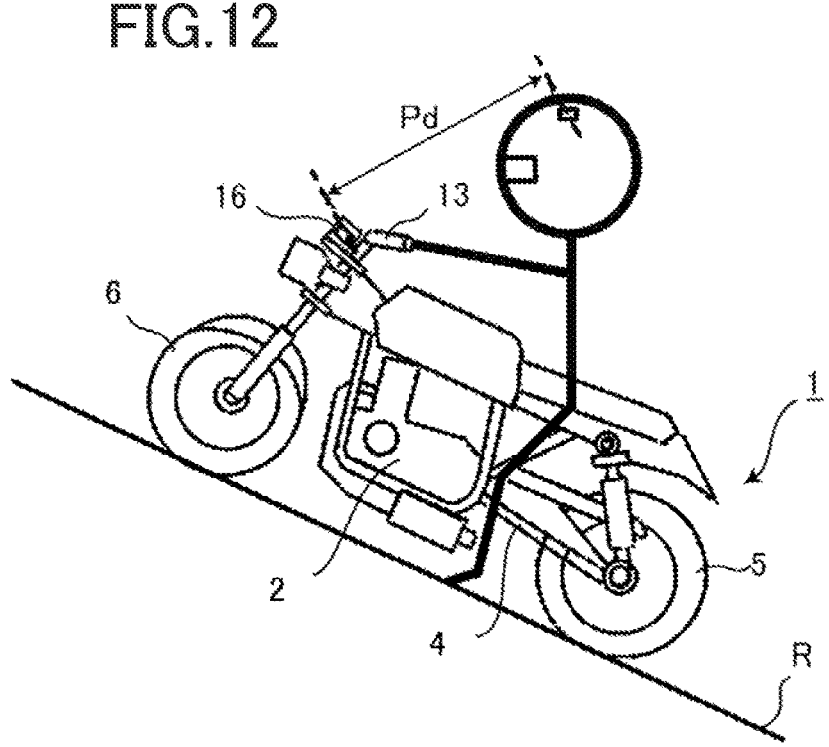
Figure 13:
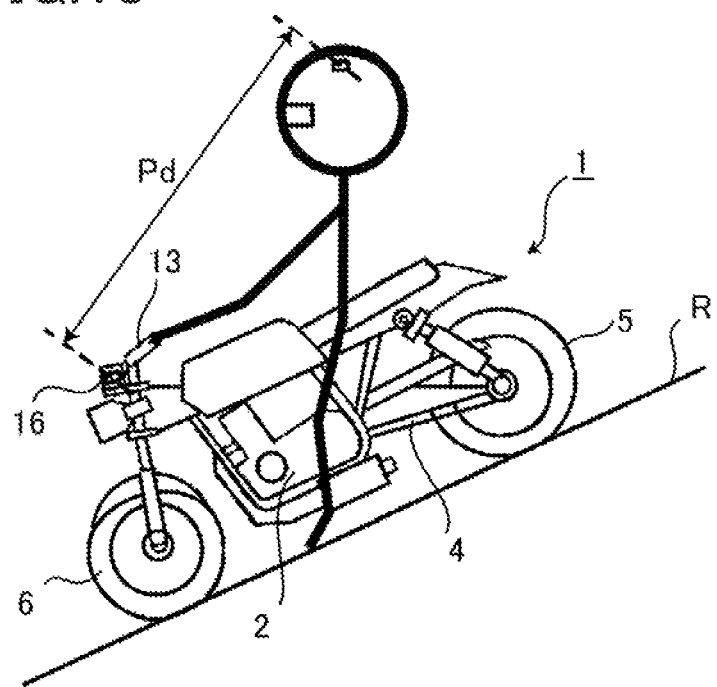
Figure 14:
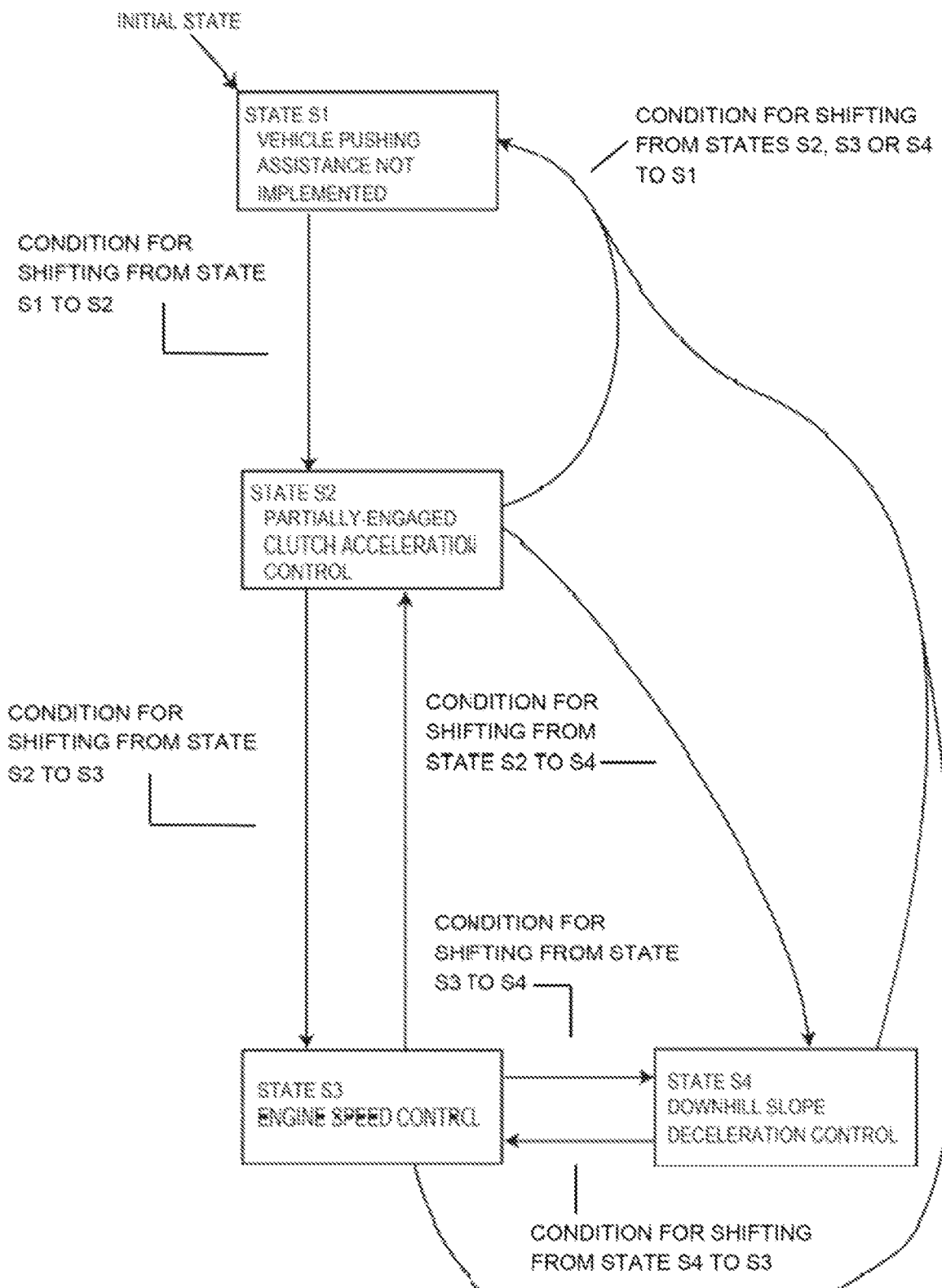
Figure 15:
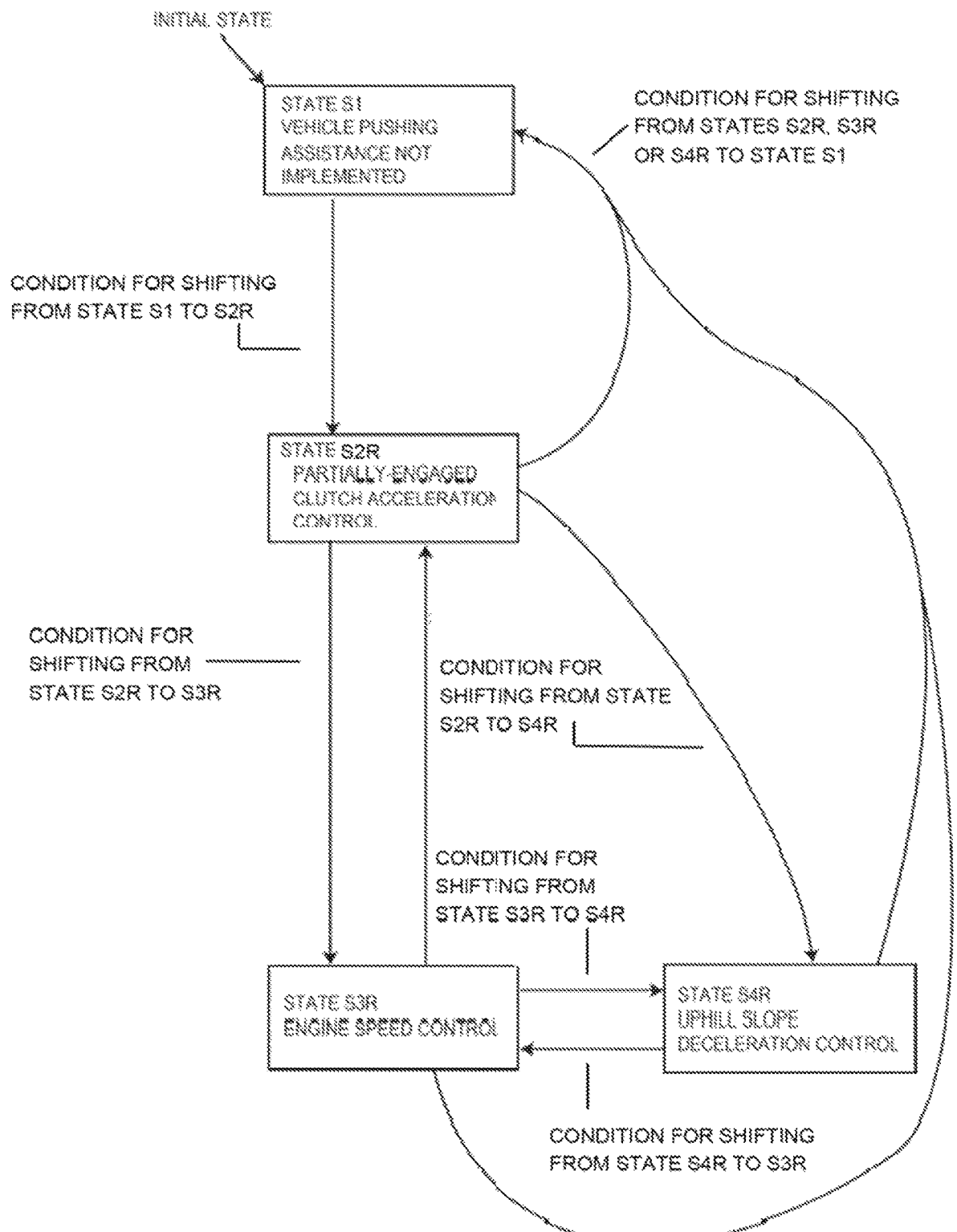
Figure 16:
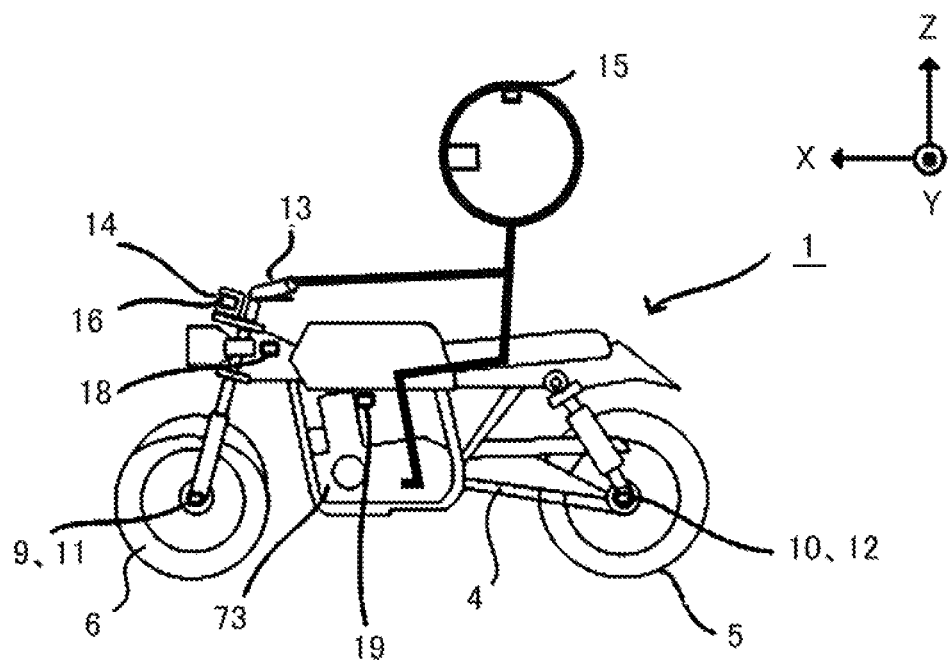
Figure 17:
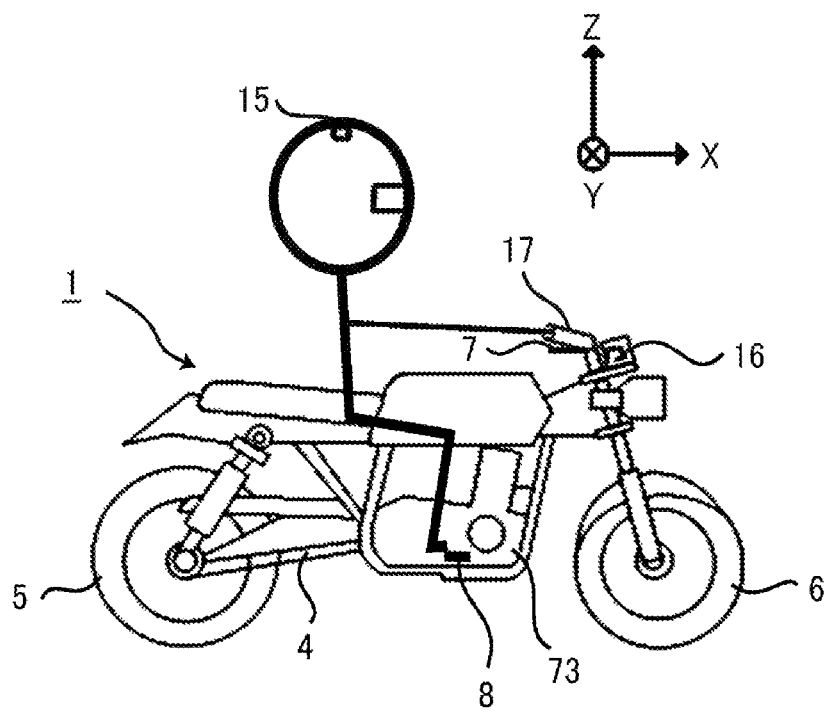
Figure 18:
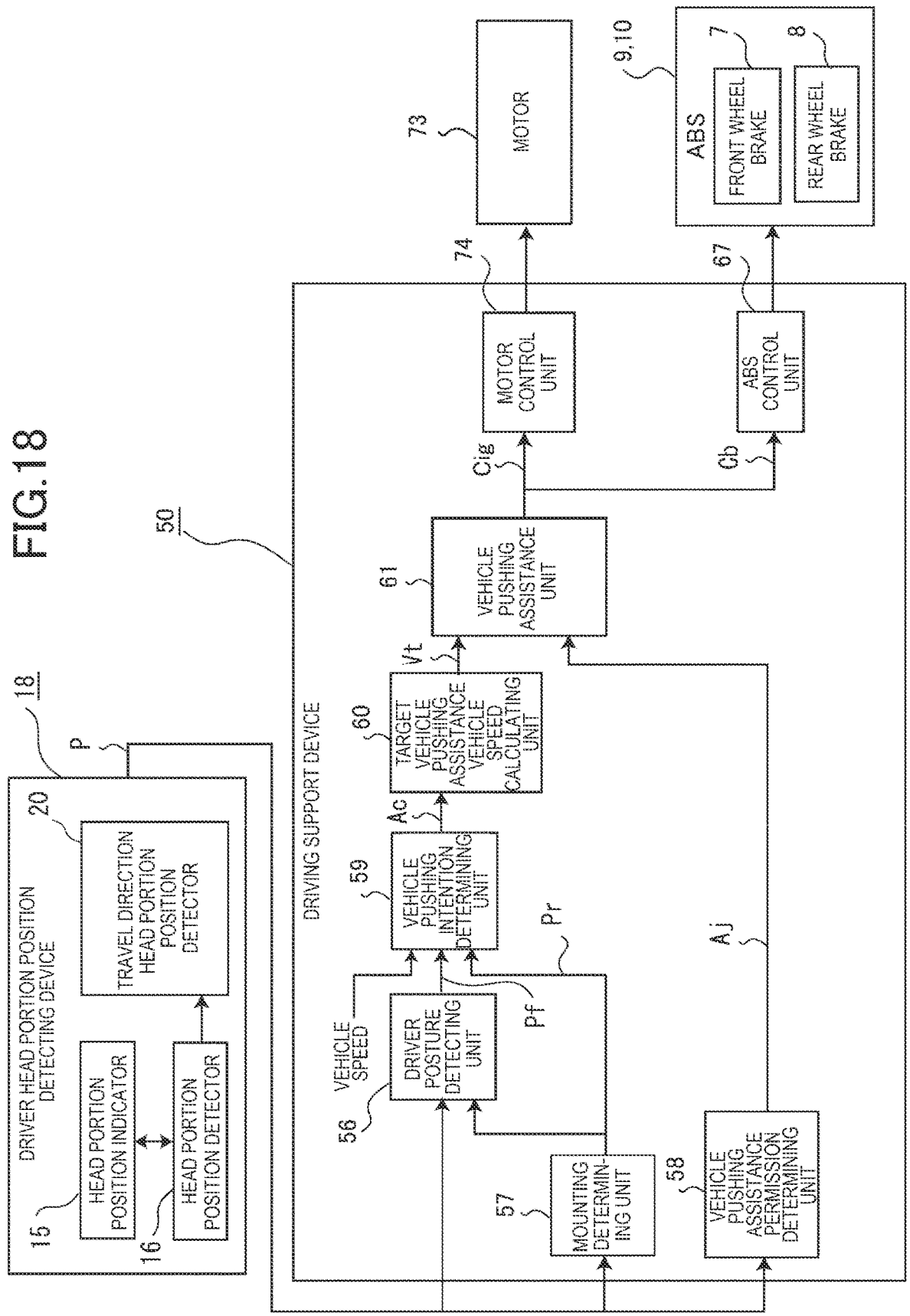
Figure 19:
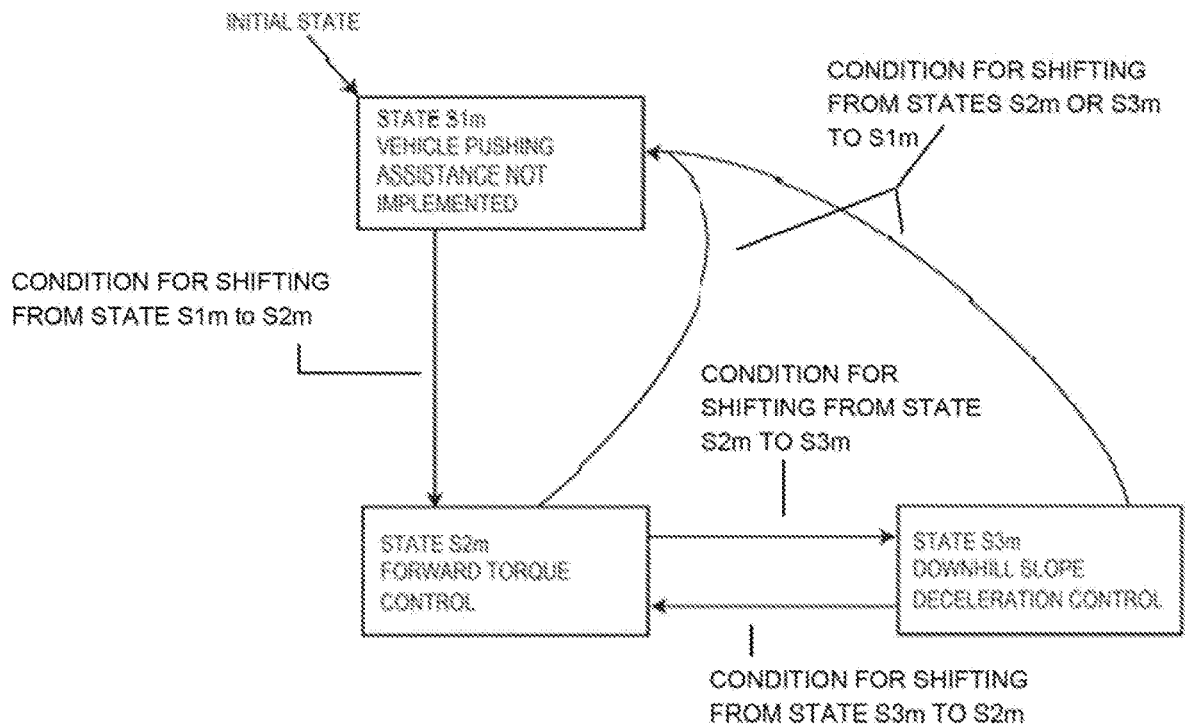
Figure 20:
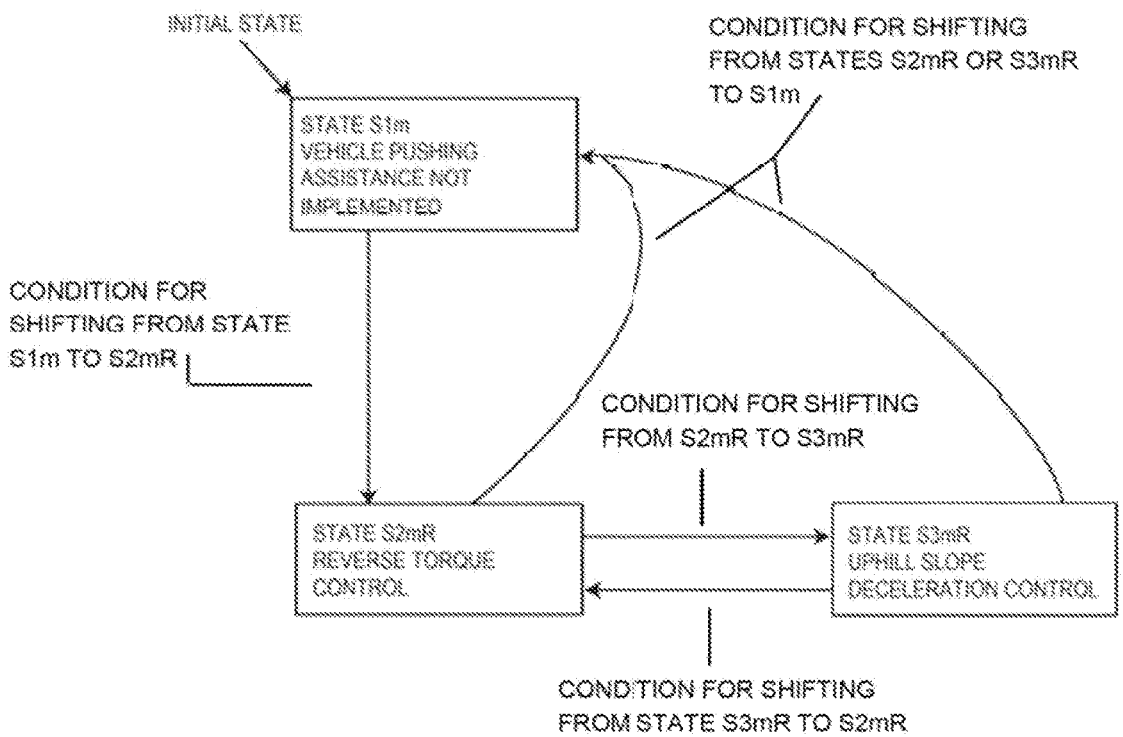

FIG. is a right side view of the vehicle according to the first embodiment;

FIG. 3 is a front view of the vehicle that illustrates a driver head portion position detecting device according to the first embodiment;

FIG. 4 is a left side view of the vehicle that illustrates the driver head portion position detecting device according to the first embodiment;

FIG. 5 is a hardware configuration drawing of a driving support device according to the first embodiment;

FIG. 6 is a system configuration drawing of the driving support device according to the first embodiment;

FIG. 7 is a left side view that illustrates a mounted vehicle forward direction vehicle pushing posture of a driver according to the first embodiment;

FIG. 8 is a left side view that illustrates a mounted vehicle backward direction vehicle pushing posture of the driver according to the first embodiment;

FIG. 9 is a left side view that illustrates a dismounted vehicle forward direction vehicle pushing posture of the driver according to the first embodiment;

FIG. 10 is a left side view that illustrates a dismounted vehicle backward direction vehicle pushing posture of the driver according to the first embodiment;

FIG. 11 is a front view that illustrates a determination of whether the driver is mounted or dismounted according to the first embodiment;

FIG. 12 is a left side view that illustrates a positional relationship between the vehicle and the driver head portion position when there is an upward inclination according to the first embodiment;

FIG. 13 is a left side view that illustrates a positional relationship between the vehicle and the driver head portion position when there is a downward inclination according to the first embodiment;

FIG. 14 is a state shift drawing that illustrates vehicle forward direction vehicle pushing assistance control by the driving support device according to the first embodiment;

FIG. 15 is a state shift drawing that illustrates vehicle backward direction vehicle pushing assistance control by the driving support device according to the first embodiment;

FIG. 16 is a left side view of vehicle according to a second embodiment;

FIG. 17 is right side view of the vehicle according to the second embodiment;

FIG. 18 is a system configuration drawing of the driving support device according to the second embodiment;

FIG. 19 is a state shift drawing that illustrates vehicle forward direction vehicle pushing assistance control by the driving support device according to the second embodiment; and FIG. 20 is a state shift drawing that illustrates vehicle backward direction vehicle pushing as control by the driving support device according to the second embodiment.

DETAILED DESCRIPTION OF THE PREFERRED EMBODIMENTS

First Embodiment

A first embodiment relates to a device that, in a case of a vehicle having an engine as a power source, an automatic two-wheeled vehicle for example, carries out vehicle pushing assistance using a driver head portion position for an operation of causing the automatic two-wheeled vehicle to move via pushing by a driver, without using engine power.

Two means of pushing an automatic two-wheeled vehicle are conceivable. One is mounted vehicle pushing, carried out in a state wherein a driver straddles the automatic two-wheeled vehicle, and the other is dismounted vehicle pushing, carried out by the driver dismounting from the automatic two-wheeled vehicle, standing on the left side of the automatic two-wheeled vehicle, placing a hand on the handlebar or the seat, and supporting the automatic two-wheeled vehicle.

An automatic two-wheeled vehicle is structurally unable to stand erect, meaning that when pushing the vehicle the driver needs to carry out a movement of the automatic two-wheeled vehicle or a handlebar operation while supporting the automatic two-wheeled vehicle, and a burden on the driver is considerable. This burden materializes still more noticeably when transporting a large vehicle or moving on an inclined road by pushing. Furthermore, there are cases wherein vehicle, pushing is carried out by utilizing engine power in a state wherein the clutch is partially engaged when moving uphill, which is a difficult operation for a driver who is unused to an automatic two-wheeled vehicle, as an accelerator operation and a clutch operation are involved.

A driving support device according to the first embodiment has an object of realizing an engine-based vehicle pushing assistance function that, in a situation wherein this kind of vehicle pushing is needed, is compatible with mounted pushing and dismounted pushing by using a driver head portion position, thereby lessening the vehicle pushing burden on the driver.

Hereafter, referring to the drawings, a preferred embodiment of the present application will be described in detail. Identical reference signs will be allotted to identical details and corresponding portions, and a detailed description thereof will be omitted. In subsequent embodiments too, a redundant description will be omitted with regard to configurations to which identical reference signs are allotted.

Description of Configuration

Figure 1:
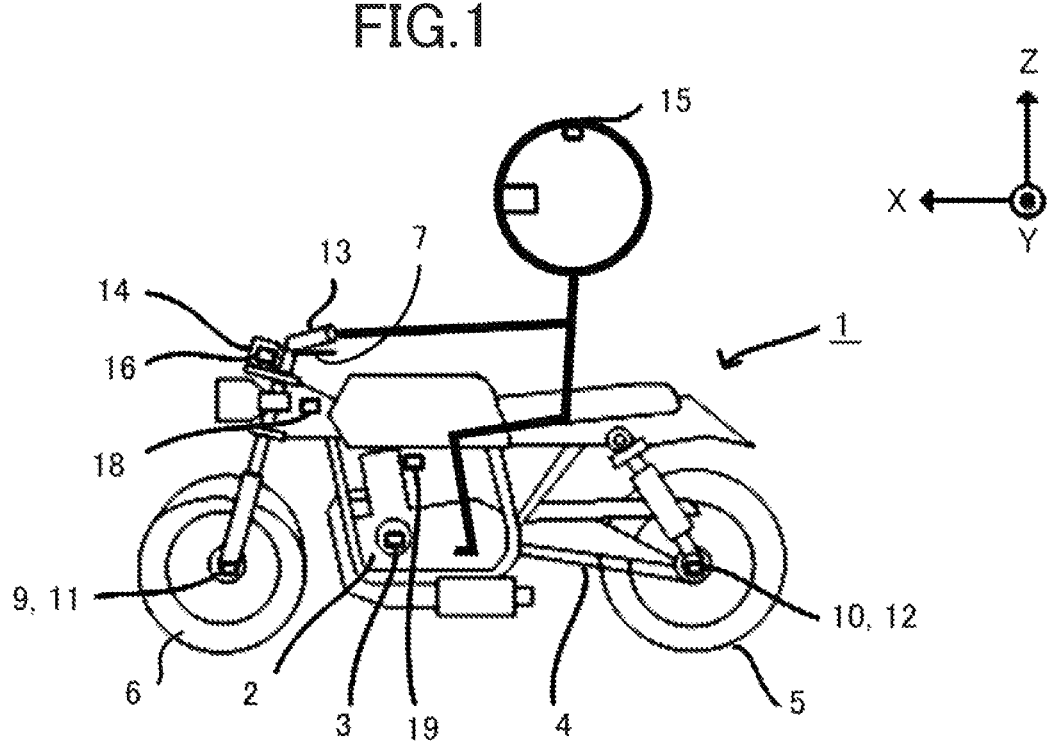
FIG. 1 is a left side view of a vehicle according to a First embodiment.
Figure 2:
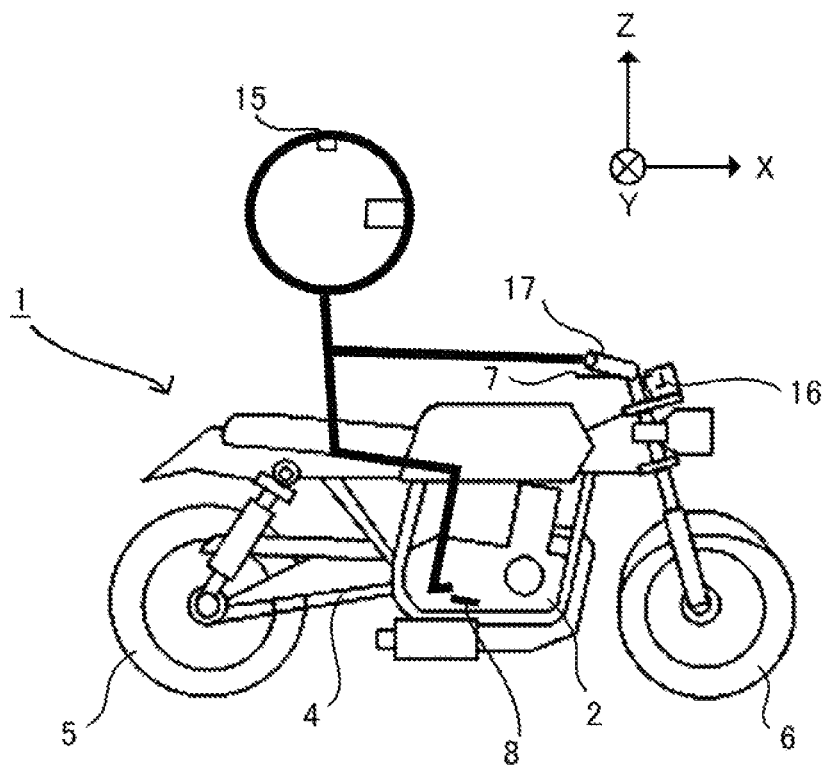

FIG. 1 shows a left side view of an automatic two-wheeled vehicle (hereafter called the vehicle) according to the first embodiment, and FIG. 2 shows a right side view of the vehicle according to the first embodiment.

In FIGS. 1 and 2, a vehicle 1 is a saddled vehicle that travels by power generated by an engine 2, which functions as a power source, being transmitted to a rear wheel 5 via a transmission 3, a drive chain 4, and the like. The transmission 3 is an automated manual transmission that includes an electronically controlled gearshift and an electronically controlled clutch, to be described hereafter. Furthermore, the transmission 3 includes a reverse gear for backward travel.

A front, wheel brake 7 and a rear wheel brake 8, installed in front wheel 6 and the rear wheel respectively, include an electronically controllable system formed of a front wheel anti-lock braking system (ABS) 9 and a rear wheel ABS 10 respectively, a front wheel speed sensor 11 is included in the front wheel 6, and a rear wheel speed sensor 12 is included in the rear wheel 5. A meter device 14 that displays information such as speed or distance is included in a vicinity of a handlebar 13. A head portion position indicator 15 is installed in a helmet worn by driver in order to detect a driver head portion position P, and a head portion position detector 16 is installed in the vehicle 1. Also, an accelerator 17 is included in the handlebar 13.

A driver head portion position detecting device 18 that detects the driver head portion position P is disposed below the meter device 14. The driver head portion position detecting device 18 may be disposed integrated with an electronic control unit (ECU) that carries out control of the engine 2 and the like. A gyro sensor 19 that can detect a roll angle, a pitch angle, and a yaw angle of the vehicle 1 is included in a center of the vehicle 1.

The driver head portion position detecting device 18 is configured of the head portion position indicator 15, the head portion position detector 16, and a travel direction head portion position detector 20 (refer to FIG. 6, to be described hereafter) that detects the driver head portion position P in a direction of travel of the vehicle 1. Wireless communication is carried out reciprocally between the head portion position indicator 15 and the head portion position detector 16, and the head portion position detector 16 transmits information relating to a positional relationship between the two to the travel direction head portion position detector 20. The head portion position indicator 15 is provided in a position on a central line passing through an apex portion of a helmet worn by the driver and a forehead. The head portion position detector 16 is provided in a vicinity of a central portion of the handlebar 13.

An instrument that has a distance measuring function and an angle measuring function in addition to a communication function can be used as the head portion position indicator 15 and the head portion position detector 16. Specifically, a Bluetooth communicator or an ultra-wideband (UWB) communicator may be used. The travel direction head portion position detector 20 detects the driver head portion position P in a vehicle travel direction based on information relating to a radio wave angle of arrival and a radio wave intensity. As shown in FIGS. 3 and 4, the driver head portion position P is configured of a distance Pd between the vehicle 1 and the driver, which is a distance from the head portion position indicator 15 on the vehicle 1 side to the head portion position detector 16 installed in the vehicle 1, and a driver head portion position angle Pθ detected from the positional relationship between the head portion position indicator 15 and the head portion position detector 16. In FIG. 3, reference sign A indicates a vehicle central line, and reference sign B indicates a head portion position straight line. Also, in FIGS. 3 and 4, R indicates a road surface.

A multiple of head portion position detectors 16 may be included with respect to the head portion position indicator 15. This is because accurate position detection can be carried out using measurement that employs triangulation. Also, in this case, the head portion position detector 16 need not be disposed in a vicinity of the central portion of the handlebar 13. In this case too, it is desirable that a position is identified with a place on the vehicle 1 wherein comparison is easy, such as the central portion of the handlebar 13, as a reference. The position measuring method is not limited to radio waves. Position measurement may also be carried out from image information obtained from ultrasonic waves, a laser, or camera imaging.

Next, a driving support device according to the first embodiment will be described.

Driving Support Device Hardware Configuration

FIG. 5 is a hardware configuration drawing of a driving support device according to the first embodiment.

A driving support device 50 is a control device that executes support of an operation by a driver of pushing the vehicle 1. Each function of the driving support device 50 is realized by a processing circuit included in the driving support device 50. Specifically, the driving support device 50 includes an arithmetic processing device (a computer) 51, such as a central processing unit (CPU), as the processing circuit, a storage device such as a random access memory (RAM) 52, which is configured in such a way as to be able to read data from and write data into the arithmetic processing device 51, or a read only memory (ROM) 53, which is configured in such a way as to be able to read data from the arithmetic processing device 51, an input circuit 54 that inputs an external signal into the arithmetic processing device 51, an output circuit 55 that outputs a signal to an exterior from the arithmetic processing device 51, and the like.

An application-specific integrated circuit (ASIC), an integrated circuit (IC), a digital signal processor (DSP), a field-programmable gate array (FPGA), various kinds of logic circuit, various kinds of signal processing circuit, and the like, may be included as the arithmetic processing device 51. Also, a multiple of the same kind or of differing kinds may be included as the arithmetic processing device 51, and processes shared among these and executed.

In addition to the RAN 52 and the ROM 53, a non-volatile memory, such as a flash memory, an EPROM, or an EEPROM, or a volatile semiconductor memory, a magnetic disc, a flexible disc, an optical disc, a compact disc, a minidisc, a DVD, or the like, may be used as a storage device. Various kinds of sensor, switch, and communication line that include an output signal of the head portion position detector 16 are connected to the input circuit 54, and an A/D converter, a communication circuit, and the like, that input output signals from the sensors and switches, and communication information, into the arithmetic processing device 51 are included. The output circuit 55 includes a drive circuit or the like that outputs a control signal from the arithmetic processing device 51 to a drive device that drives the vehicle 1. Also, control can also be carried out by a signal being sent to another control device via the output circuit 55.

Each function included in the driving support device 50 realized by the arithmetic processing device 51 executing software (a program) stored in a storage device such as the RAM 52 or the ROM 53, and operating in conjunction with other hardware of the driving support device 50, such as a storage device such as the RAM 52 or the ROM 53, the input circuit 54, or the output circuit 55. The arithmetic processing device 51 is such that a program may be input from a storage device such as the RAM 52 or the ROM 53 into the arithmetic processing device 51 via a volatile storage device. Also, the arithmetic processing device 51 may output data such as a computation result to a storage device such as the RAM 52 or the ROM 53. Also, data may be stored in a non-volatile storage device via a volatile storage device. Setting data such as a threshold and a determination value used by the driving support device 50 are stored in a storage device such as the RAM 52 or the ROM 53 as one portion of the software (program). Each function included in the driving support device 50 may be configured of a software module, but may also be configured of a combination of software and hardware.

Description of System Configuration

Next, a system configuration of the driving support device 50 will be described.

FIG. 6 is a drawing showing a system configuration of the driving support device 50, and shows a system configuration of a vehicle pushing assistance function that has the engine 2 as a power source.

The system is configured of the driver head portion position detecting device 18, which detects the driver head portion position P, the driving support device 50, which computes each controlled variable based on the driver head portion position P and vehicle information, and the engine 2, the transmission 3, the front wheel ABS 9, and the rear wheel ABS 10, which are targets of control by the driving support device 50.

The driving support device 50, with the driver head portion position P output from the driver head portion position detecting device 18 and vehicle information as inputs, carries out a process co be described hereafter using a processing unit configured of a driver posture detecting unit 56, a mounting determining unit 57, a vehicle pushing assistance permission determining unit 58, a vehicle pushing intention determining unit 59, a target vehicle pushing assistance vehicle speed calculating unit 60, a vehicle pushing assistance unit 61, a fuel injection control unit 62, an ignition timing control unit 63, an electronically-controlled throttle control unit 64, an electronically-controlled clutch control unit 65, an electronically-controlled gearshift control unit 66, and an ABS control unit 67, and realizes a vehicle pushing assistance function by controlling the engine 2, the transmission 3, the front wheel ABS 9, and the rear wheel ABS 10.

The driver posture detecting unit 56 calculates a detected value, that is, a forward leaning posture degree Pf indicating an extent to which a driver has a forward leaning posture with respect to the vehicle 1, as shown in FIG. 7, or a backward leaning posture as shown in FIG. 8, from the distance Pd between the vehicle 1 and the driver using the equation below, thereby determining the posture of the driver.

Forward leaning posture degree Pf=reference mounted posture threshold Pd_th−distance Pd between vehicle 1 and driver.

When a relationship of the distance Pd between the vehicle 1 and the driver with respect to the reference mounted posture threshold Pd_th, which has the driver posture as a reference, when the vehicle 1 is stopped is such that the distance Pd between the vehicle and the driver<the reference mounted posture threshold Pd_th, it is determined that the driver has a forward leaning posture, and the forward leaning posture degree Pf>0. Also, when the distance Pd between the vehicle 1 and the driver>the reference mounted posture threshold Pd_th, it is determined that the driver has a backward leaning posture, and the forward leaning posture degree Pf<0.

A mounted head portion position of the driver when the vehicle A is stopped may be learned in advance, and the reference mounted posture threshold Pd_th may be calculated based on the learned value, or the reference mounted posture threshold Pd_th may be a parameter whose setting can be changed by an operation by the driver. Also, separate reference mounted posture thresholds Pd_th for when mounted and when dismounted may be provided by using a driver mounting determination value Pr calculated by the mounting determining unit 57. A forward leaning posture and a backward leaning posture when dismounted are shown in FIGS. 9 and 10 respectively.

The mounting determining unit 57 determines whether the driver is mounted based on the driver head portion position P, and calculates the driver mounting determination value Pr. FIG. 11 shows a front view of the vehicle 1 when the driver is mounted and dismounted according to the mounting determining unit 57.

When the driver head portion position P positioned within a normal mounted head portion position range Pr_rng, it is determined that the driver is in a vehicle mounting state of straddling the vehicle 1, and the driver mounting determination value Pr=1.

The normal mounted head portion position range Pr_rng is set to be a range of the driver head portion position P when the driver is mounted and pushing the vehicle. This means that in the present embodiment, wherein the driver head portion position P is configured of a driver head portion position angle Pθ and the distance Pd between the vehicle 1 and the driver, upper and lower limit values of the driver head portion position angle Pθ and the distance Pd between the vehicle 1 and the driver whereby it is determined that the driver is mounted and pushing the vehicle form the normal mounted head portion position range Pr_rng. The upper and lower limit values fluctuate in accordance with the driver head portion position P.

When the driver head portion position P is positioned within a vehicle left side upright head portion position range Pl_rng, it is determined that the driver is in a vehicle left side upright state of being dismounted from the vehicle 1 and standing on the left side of the vehicle, and the driver mounting determination value Pr=2. The vehicle left side upright head portion position range Pl_rng is set to be a range of the driver head portion position P when dismounted and pushing the vehicle.

In the present embodiment, upper and lower limit values of the driver head portion position angle Pθ and the distance Pd between the vehicle 1 and the driver whereby it is determined that the driver is dismounted and pushing the vehicle form the vehicle left side upright head portion position range Pl_rng, in the same way as in the case of the normal mounted head portion position range Pr_rng. The upper and lower limit values fluctuate in accordance with the driver head portion position P.

When the driver head portion position P is not included in the normal mounted head portion position range Pr_rng or the vehicle left side upright head portion position range Pl_rng, the driver head portion position P is determined to be outside a vehicle pushing assistance range, and the driver mounting determination value Pr=0.

When the driver head portion position P is configured of information other than the driver head portion position angle Pθ and the distance Pd between the vehicle 1 and the driver, the normal mounted head portion position range Pr_rng and the vehicle left side upright head portion position range Pl_rng are determined in accordance with a setting of upper and lower limit values of each item of information. For example, in the case of a system wherein the driver head portion position P is calculated in accordance with three items of distance information from between a sensor installed in the apex portion of the helmet and sensors installed in three places in the vehicle 1, the normal mounted head portion position range Pr_rng and the vehicle left side upright head portion position range Pl_rng are determined from upper and lower limit values set for each of the three items of distance information.

A mounted posture or a dismounted posture of the driver when the vehicle is stopped may be learned in advance, and the normal mounted head portion position range Pr_rng or the vehicle left side upright head portion position range Pl_rng may be calculated based on the learned value. Also, the normal mounted head portion position range Pr_rng and the vehicle left side upright head portion position range Pl_rng may be calculated based on driver body information input in advance by the driver.

Although the vehicle mounting state and the vehicle left side upright state are determined in accordance with the driver head portion position P in the present embodiment, another driver mounting determination system, such as a mounting determination using a pressure sensor attached to a vehicle seat, may be used.

The vehicle pushing intention determining unit 59 determines that the driver intends to implement a vehicle pushing, and determines an operation direction, based on information wherein the vehicle speed is added to the forward leaning posture degree Pf from the driver posture detecting unit 56, and outputs a vehicle pushing command value Ac. When the forward leaning posture degree Pf exceeds an advancement intention threshold Af_th, and the vehicle speed in a forward direction is equal to or greater than a forward vehicle pushing implementation vehicle speed Afv_th, it is determined that the driver intends to advance by pushing the vehicle, and the vehicle pushing command value Ac calculated from the following Equation 1 to be such that vehicle pushing command value Ac>0.

Vehicle pushing command value Ac=forward leaning posture degree Pf−advancement intention threshold Af_th    1

The vehicle speed in the forward direction and the vehicle speed in a backward direction are calculated by combining travel direction information and vehicle speed information that does not include travel direction information. Travel direction information can be calculated by using a sensor or a system such as an acceleration sensor, a GPS, or image processing, and calculation means is not an issue. Vehicle speed information that does not include travel direction information is calculated using a vehicle speed sensor mounted on the front wheel 6 or the rear wheel 5.

When the forward leaning posture degree Pf is less than a reversing intention threshold Ar_th, and the vehicle speed in a backward direction is equal to or greater than a backward vehicle pushing implementation vehicle speed Arv_th, it is determined that the driver intends to reverse by pushing the vehicle, and the vehicle pushing command value Ac is calculated from the following Equation 2 to be such that vehicle pushing command value Ac<0.

Vehicle pushing command value Ac=forward leaning posture degree Pf−reversing intention threshold Ar_th    2

When the forward leaning posture degree Pf, the vehicle speed in the forward direction, and the vehicle speed in the backward direction do not meet any of the aforementioned conditions, it is determined that the driver does not intend to advance or reverse by pushing the vehicle, and the vehicle pushing command value Ac=0.

The advancement intention threshold Af_th and the reversing intention threshold Ar_th are such that the thresholds are caused to fluctuate between when mounted and when dismounted using the driver mounting determination value Pr output from the mounting determining unit 57. Specifically, compared with when pushing the vehicle when mounted, fluctuation of the driver head portion position P is larger, and fluctuation of the forward leaning posture degree Pf is larger, when pushing the vehicle when dismounted, because of which an interval between the advancement intention threshold Af_th and the reversing intention threshold Ar_th is set to be larger when pushing the vehicle when dismounted, thereby preventing a malfunction of vehicle pushing assistance.

Also, a positional relationship between the vehicle and the driver head portion position P when not implementing a vehicle pushing, which forms a reference for posture determination, fluctuates in accordance with a vehicle inclination state, because of which a threshold manipulation that accords with the inclination state, such as setting each of the advancement intention threshold Af_th and the reversing intention threshold Ar_th to be larger when there is an upward inclination (the distance Pd between the vehicle 1 and the driver when normally mounted is small), as shown in FIG. 12, and setting each to be smaller when there is a downward inclination (the distance Pd between the vehicle 1 and the driver when normally mounted is large), as shown in FIG. 13, may be carried out.

The reason for not only the forward leaning posture degree Pf but also the vehicle speed coinciding with the direction in which the driver is pushing the vehicle being a trigger for starting vehicle pushing assistance according to the vehicle pushing intention determining unit 59 is that vehicle pushing assistance unwanted by the driver is prevented by a start of vehicle pushing assistance being executed after the driver implementing vehicle pushing is detected.

Also, without using vehicle speed information as a trigger for starting vehicle pushing assistance, the trigger may be the forward leaning posture degree Pf alone. In this case, it is desirable that assistance mode switching means such as a switch is provided instead of vehicle speed information in order to elicit a driver's wish for assistance, and a determination that vehicle pushing assistance is to be started is implemented in accordance with assistance mode switching information from the assistance mode switching means. When implementing an assistance mode using a switch, an assistance mode switching switch is provided in the handlebar 13, and switching can be carried out between a normal mode, a forward vehicle pushing assistance mode, and a backward vehicle pushing assistance mode by an operation by the driver.

When selecting the forward vehicle pushing assistance mode, the vehicle pushing command value Ac is calculated using the aforementioned Equation 1 when forward leaning posture degree Pf>advancement intention threshold Af_th is fulfilled. Also, when selecting the backward vehicle pushing assistance mode, the vehicle pushing command value Ac is calculated using the aforementioned Equation 2 when forward leaning posture degree Pf<reversing intention threshold Ar_th is fulfilled. When selecting the normal mode, the vehicle pushing command value Ac=0.

Vehicle pushing assistance using a switch is more effective than vehicle pushing assistance having vehicle speed information as a trigger when utilized on a steep uphill slope or a steep downhill slope. When implementing vehicle pushing assistance having vehicle speed information as a trigger on a steep uphill slope or a steep downhill slope, the following kinds of problem occur.

1. When a force in the backward direction caused by gravity is large with respect to power of the driver to push the vehicle in the forward direction rah a steep uphill slope, there is no vehicle speed in the forward direction, and vehicle pushing assistance cannot be started.

2. The vehicle moves forward against the intention of the driver due to a force in the forward direction caused by gravity on a steep downhill slope, and vehicle pushing assistance malfunctions. A situation wherein vehicle pushing assistance cannot be operated as the driver intends in this way occurs prominently in a case of a large vehicle of a heavy weight, wherein vehicle pushing assistance is more necessary.

In response to this, vehicle pushing assistance using a switch is such that vehicle pushing assistance implemented in accordance with the assistance mode selected using the switch and the driver head portion position P, because of which the problems in the aforementioned situations are resolved.

The target vehicle pushing assistance vehicle speed calculating unit 60 converts the vehicle pushing command value Ac from the vehicle pushing intention determining unit 59 into a target vehicle pushing assistance vehicle speed Vt. The target vehicle pushing assistance vehicle speed Vt is calculated using a target vehicle pushing assistance vehicle speed conversion factor, as in the following equation.

Target vehicle pushing assistance vehicle speed Vt=target vehicle pushing as vehicle speed conversion factor (vehicle pushing command value Ac).

When target vehicle pushing assistance vehicle speed Vt>0, the vehicle 1 is to be assisted in the forward direction.

When target vehicle pushing assistance vehicle speed Vt<0, the vehicle 1 is to be assisted in the backward direction. When target vehicle pushing assistance vehicle speed Vt=0, vehicle pushing assistance is to be stopped.

Although the target vehicle pushing assistance vehicle speed Vt is determined based on the vehicle pushing command value Ac, using a target vehicle pushing assistance vehicle speed conversion factor, a relationship between the vehicle pushing command value Ac and the target vehicle pus assistance vehicle speed Vt may be set freely in accordance with a form of the vehicle 1 or an assumed driver competency.

For example, when the vehicle pushing command value Ac is other than 0, the relationship can be limited to switching between implementing vehicle pushing assistance and stopping assistance in accordance with a driver posture by setting the vehicle pushing assistance vehicle speed to be an arbitrary unique vehicle speed, in order that vehicle pushing assistance becomes effective in a case of a driver posture such that the vehicle pushing command value Ac is other than 0, and vehicle pushing assistance is stopped in a case of a driver posture such that the vehicle pushing command value Ac is 0. By so doing, stable vehicle pushing can be assisted even when the driver posture unintentionally changes during vehicle pushing.

Also, by providing arbitrary thresholds with respect to the vehicle pushing command value Ac, and setting each target vehicle pushing assistance vehicle speed Vt in accordance with a threshold range, the vehicle speed can be adjusted in accordance with the posture degree in the same way that the driver adjusts the vehicle speed using an accelerator operation. Furthermore, a multiple assistance modes selectable by the driver may be provided, and target vehicle pushing assistance vehicle speeds Vt that differ in accordance with the selected mode may be output, even when the vehicle pushing command value Ac is the same.

The vehicle pushing assistance permission determining unit 58 determines, based on the driver head portion position P and a vehicle state, whether the vehicle state is such that vehicle pushing assistance can be implemented appropriately. When the driver head portion position P is outside a predetermined value range, a vehicle pushing assistance permission determination Aj is unfulfilled, and vehicle pushing assistance is prohibited. This is in order to prevent a state wherein the distance between the driver and the vehicle 1 becomes too great during vehicle pushing assistance, or to prevent vehicle pushing assistance at an unusual posture.

A determination based on the vehicle state is such that when the front wheel or the rear wheel speed exceeds a predetermined value, when an accelerator aperture exceeds a predetermined value, when a throttle aperture exceeds a predetermined value, when an engine speed exceeds a predetermined value, when the clutch is operated by the driver, when a kickstand is not stored, when the roll angle of the vehicle 1 exceeds a predetermined value, and the like, the vehicle pushing assistance permission determination Aj is unfulfilled, and vehicle pushing assistance is prohibited. Conditions for prohibiting vehicle pushing assistance may be provided separately for before implementing vehicle pushing assistance and during implementation. When the condition for the vehicle pushing assistance permission determination Aj being unfulfilled is not fulfilled, the vehicle pushing assistance permission determination Aj is taken to be fulfilled, and an implementation of vehicle pushing assistance is permitted.

The vehicle pushing assistance unit 61 is such that a controlled variable for each actuator (a fuel injection controlled variable Cf, an ignition timing controlled variable Cig, a throttle aperture controlled variable Cth, a clutch controlled variable Cc, a gearshift controlled variable Cs, and a braking controlled variable Cb) is computed in accordance with the target vehicle pushing assistance vehicle speed Vt and the current vehicle state, and vehicle speed feedback control with respect to the target vehicle pushing assistance vehicle speed Vt is implemented.

A target vehicle speed differential Vd is calculated from the target vehicle pushing assistance vehicle speed Vt and a current vehicle speed Vr as in the following equation.

$$Vd=Vt-Vr$$

A vehicle speed including travel direction information is used as the current vehicle speed Vr, and the current vehicle speed Vr is taken to be a vehicle speed in the forward direction when current vehicle speed Vr>0, and a vehicle speed in the backward direction when current vehicle speed Vr<0.

FIGS. 14 and 15 show state shift drawings for controlling vehicle pushing assistance in the forward direction and controlling vehicle pushing assistance in the backward direction respectively. An initial state is a state S1, and the state S1 is a state wherein vehicle pushing assistance is not implemented.

Forward Direction Vehicle Pushing Assistance Control Condition for Shifting from State S1 to State S2

As shown in FIG. 14, there is a shift to a state S2 when the vehicle pushing assistance permission determination Aj is fulfilled, and target vehicle pushing assistance vehicle speed Vt>0 is fulfilled, in the state S1.

When shifting from the state S1 to the state S2, the clutch controlled variable Cc and the gearshift controlled variable Cs are manipulated in such a way that the clutch is disengaged in a first gear.

The clutch controlled variable Cc is a controlled variable for controlling a disengaged clutch (a state wherein engine power is not transmitted), an extent of a partially-engaged clutch (a state wherein engine power is partially transmitted), and an engaged clutch (a state wherein engine power is transmitted), and is a controlled variable such that a value thereof increases as there is a shift from a disengaged clutch to an engaged clutch.

State S2 Control

In the state S2, an inclined state for which engine power is needed in order to cause the vehicle 1 to advance is assumed, and vehicle speed control is carried out by controlling an engine power transmission rate in a partially-engaged clutch state.

While target vehicle speed differential Vd>forward acceleration command threshold Vdh_th in the state S2, the transmission rate of engine power to a drive wheel is increased by gradually increasing the clutch controlled variable Cc, thereby causing the vehicle speed in the vehicle forward direction to increase. A threshold setting is carried out in such a way that forward acceleration command threshold Vdh_th≥0.

In the state S2, the throttle aperture controlled variable Cth is manipulated in such a way that the engine speed is kept constant at a forward direction vehicle pushing partially-engaged clutch engine speed Afne_th, regardless of a fluctuation in the extent of the partially-engaged clutch.

When target vehicle speed differential Vd<backward acceleration command threshold Vdl_th in the state S2, the transmission rate of engine power to the drive wheel is reduced by gradually reducing the clutch controlled variable Cc, thereby causing the vehicle speed in the vehicle forward direction to decrease. A threshold setting is carried out in such a way that backward acceleration command threshold $Vdl\_th \leq 0$.

When backward acceleration command threshold $Vdl\_th \leq$ target vehicle speed differential $Vd \leq$ forward acceleration command threshold $Vdh\_th$ in the state S2, the clutch controlled variable Cc is maintained, and the current vehicle speed is maintained.

Herein, when controlling vehicle pushing assistance in the forward direction, the forward acceleration command threshold $Vdh\_th$ is a threshold between maintaining the current vehicle speed and a forward direction acceleration command, and the backward acceleration command threshold $Vdl\_th$ a threshold between maintaining the current vehicle speed and a forward direction deceleration (a backward direction acceleration when the backward direction is a reference) command.

Also, when controlling vehicle pushing assistance in the backward direction, the forward acceleration command threshold $Vdh\_th$ is a threshold between maintaining the current vehicle speed and a backward direction deceleration (a forward direction acceleration when the forward direction is a reference) command, and the backward acceleration command threshold $Vdl\_th$ is a threshold between maintaining the current vehicle speed and a backward direction acceleration command. A relationship is such that backward acceleration command threshold $Vdl\_th \leq 0 \leq$ forward acceleration command threshold $Vdh\_ch$.

Condition for Shifting from State S2 to State S3

There is a shift to a state S3 when a state wherein target vehicle speed differential Vd>forward acceleration command threshold $Vdh\_th$ continues, and the clutch controlled variable Cc at which the clutch is engaged is reached, in the state S2.

Condition for Shifting from State S2 to State S4

When a vehicle speed in the vehicle forward direction corresponding to the forward direction vehicle pushing partially-engaged clutch engine speed $Afne\_th$ when the clutch is engaged is reached before a state wherein the clutch is engaged is reached, and target vehicle speed differential Vd<backward acceleration command threshold $Vdl\_th$, in the state S2, there is determined to be a downhill slope such that deceleration by braking is needed, and there is a shift to a state S4. When shifting from the state S2 to the state S4, the clutch controlled variable Cc is manipulated, whereby the clutch is engaged.

Also, when an amount of inclination detected by the gyro sensor 19 is equal to or less than a predetermined value, or when a predetermined acceleration in the vehicle forward direction occurs in a state wherein the clutch is disengaged when shifting from the state S1 to the state S2, there is determined to be a steep downhill slope, and an immediate shift may be made to the state S4.

When the inclination amount is oriented in the vehicle forward direction from the vehicle 1, the inclination amount is an amount forming a positive value in a case of an uphill slope, and an amount forming a negative value in a case of a downhill slope. The greater the inclination, the greater the absolute value of the inclination amount.

State S3 Control

In the state S3, vehicle speed control is carried out using engine speed control in a state wherein the clutch is engaged when target vehicle pushing assistance vehicle speed Vt that cannot be realized in the state S2 is required.

While target vehicle speed differential Vd>forward acceleration command threshold $Vdh\_th$ in the state S3, the throttle aperture controlled variable Cth is gradually increased, causing the engine speed to increase, and thereby causing the vehicle speed in the vehicle forward direction to increase.

The throttle aperture controlled variable Cth is a controlled variable for controlling the throttle aperture, wherein the size of the throttle aperture controlled variable corresponds to the aperture of the throttle.

When target vehicle speed differential Vd<backward acceleration command threshold $Vdl\_th$ in the state S3, the throttle aperture controlled variable Cth is gradually reduced, causing the engine speed to decrease, and thereby causing the vehicle speed in the vehicle forward direction to decrease.

When backward acceleration command threshold $Vdl\_th \leq$ target vehicle speed differential $Vd \leq$ forward acceleration command threshold $Vdh\_th$ in the state S3, the throttle aperture controlled variable Cth is maintained, and the current vehicle speed is maintained.

When a state wherein target vehicle speed differential Vd>forward acceleration command threshold $Vdh\_th$ continues, and the vehicle speed in the vehicle forward direction reaches a forward direction vehicle pushing vehicle speed upper limit $Afv\_Hth$, in the state S3, the throttle aperture controlled variable Cth maintained, and the current vehicle speed is maintained.

In the state S3, when the forward direction vehicle pushing vehicle speed upper limit $Afv\_Hth$ is set to be high, vehicle speed control in a second gear or higher may be carried out by controlling the clutch controlled variable Cc, the gearshift controlled variable Cs, and the like.

When the target vehicle pushing assistance vehicle speed Vt decreases considerably, and a state wherein target vehicle speed differential Vd<forward direction vehicle pushing braking intervention threshold $Afvb\_th$ is reached, in the state S3, it determined that there is a vehicle speed reduction request for which a braking intervention needed, and deceleration ion by braking may be carried out by manipulating the braking controlled variable Cb in accordance with the target vehicle speed differential Vd. Setting is carried out in such a way that forward direction vehicle pushing braking intervention threshold $Afvb\_th < 0$.

Condition for Shifting from State S3 to State S2

When a state wherein target vehicle speed differential Vd<backward acceleration command threshold $Vdl\_th$ continues, and the engine speed reaches the forward direction vehicle pushing partially-engaged clutch engine speed $Afne\_th$, in the state S3, there is a shift to the state S2.

Condition for Shifting from State S3 to State S4

When a state wherein target vehicle speed differential Vd<backward acceleration command threshold $Vdl\_th$ continues, and the throttle aperture reaches an engaged clutch minimum throttle aperture $Th\_Lth$ owing to a decrease in the throttle aperture controlled variable Cth, but engine speed>forward direction vehicle pushing partially-engaged clutch engine speed. $Afne\_th$, in the state S3, there is determined to be a downhill slope such that deceleration by braking is needed, and there is a shift to the state S4.

State S4 Control

In the state S4, vehicle speed control is carried out by deceleration control using braking on a downhill slope.

While target vehicle speed differential Vd<backward acceleration command threshold $Vdl\_th$ in the state S4, the braking controlled variable Cb is gradually caused to increase, increasing a braking amount, and thereby causing the vehicle speed in the vehicle forward direction to decrease.

When a state wherein target vehicle speed differential Vd>forward acceleration command threshold Vdh_th is reached in the state S4, the braking controlled variable Sb is gradually caused to decrease, reducing the braking amount, and thereby causing the vehicle speed in the vehicle forward direction to increase.

When a state wherein backward acceleration command threshold Vdl_th≤target vehicle speed differential Vd≤forward acceleration command threshold Vdh_th is reached in the state S4, the braking controlled variable Cb is maintained, and the current vehicle speed is maintained.

In a case of a vehicle in which no ABS is installed, the state at the time of shifting to the state S4 is maintained in the state S4, and a state of a maximum deceleration wherein no braking is used is maintained.

Condition for Shifting from State S4 to State S1

When a state wherein target vehicle speed differential Vd>forward acceleration command threshold Vdh_th continues, the braking controlled variable Cb decreases, and the braking amount reaches 0, in the state S4, there is a shift to the state S3.

Condition for Shifting to State S1

When the vehicle pushing assistance permission determination Aj is unfulfilled, or when target vehicle pushing assistance vehicle speed Vt≤0, in the states S2 to S4, there is a shift to the state S1, and vehicle pushing assistance in the vehicle forward direction is stopped. When shifting to the state S1, each controlled variable is adjusted in such a way that no sudden acceleration or deceleration occurs.

Backward Direction Assistance Control

In a case of a vehicle in which a reverse gear is installed, backward direction vehicle pushing assistance is implemented.

Condition for Shifting from State S1 to State S2R

As shown in FIG. 15, there is a shift to a state S2R when the vehicle pushing assistance permission determination Aj is fulfilled, and target vehicle pushing assistance vesicle speed Vt<0 is fulfilled, in the state S1.

When shifting from the state S1 to the state S2R, the clutch controlled variable Cc and the gearshift controlled variable Cs are manipulated in such a way that the clutch is disengaged when the reverse gear is engaged.

State S2R Control

In the state S2R, an inclined state for which engine power is needed in order to cause the vehicle a to reverse is assumed, and vehicle speed control is carried out by controlling the engine power transmission rate in a partially-engaged clutch state.

While target vehicle speed differential Vd<backward acceleration command threshold Vdl_th in the state S2R, the transmission rate of engine power to the drive wheel is increased by gradually increasing the clutch controlled variable Cc, thereby causing the vehicle speed in the vehicle backward direction to increase.

In the state S2R, the throttle aperture controlled variable Cth is manipulated in such a way that the engine speed is kept constant at a backward direction vehicle pushing partially-engaged clutch engine speed. Arne_th, regardless of a fluctuation in the extent of the partially-engaged clutch.

When target vehicle speed differential Vd>forward acceleration command threshold Vdh_th in the state S2R, the transmission rate of engine power to the drive wheel is reduced by gradually reducing the clutch controlled variable Cc, thereby causing the vehicle speed in the vehicle backward direction to decrease.

When backward acceleration command threshold Vdl_th≤target vehicle speed differential Vd≤forward acceleration command threshold Vdh_th in the state S2R, the clutch controlled variable Cc is maintained, and the current vehicle speed is maintained.

Condition for Shifting from State S2R to State S3R

There is a shift to a state S3R when a state wherein target vehicle speed differential Vd<backward acceleration command threshold Vdl_th continues, and the clutch controlled variable Cc at which the clutch is engaged is reached, in the state S2R.

Condition for Shifting from State S2R to State S4R

When a vehicle speed in the vehicle backward direction corresponding to the backward direction vehicle pushing partially-engaged clutch engine speed Arne_th when the clutch is engaged is reached before a state wherein the clutch is engaged is reached, and target vehicle speed differential Vd>forward acceleration command threshold Vdh_th, in the state S2R, there is determined to be an uphill slope such that deceleration by braking is needed with respect to the vehicle speed in the vehicle backward direction, and there is a shift to a state S4R. When shifting from the state S2 R to the state S4 R, the clutch controlled variable Cc is manipulated, whereby the clutch is engaged.

Also, when an amount of inclination detected by the gyro sensor 19 is equal to or greater than a predetermined value, or when a predetermined acceleration in the vehicle backward direction occurs in a state wherein the clutch is disengaged when shifting from the state S1 to the state S2R, there is determined to be a steep uphill slope, and an immediate shift may be made to the state S4R.

State S3R Control

In the state S3R, vehicle speed control is carried out using engine speed control in a state wherein the clutch is engaged when target vehicle pushing assistance vehicle speed Vt that cannot be realized in the state S2R is required.

While target vehicle speed differential Vd<backward acceleration command threshold Vdl_th in the state S3R, the throttle aperture controlled variable Cth is gradually increased, causing the engine speed to increase, and thereby causing the vehicle speed in the vehicle backward direction to increase.

When a state wherein target vehicle speed differential Vd>forward acceleration command threshold Vdh_th is reached in the state S3R, the throttle aperture controlled variable Cth is gradually reduced, causing the engine speed to decrease, and thereby causing the vehicle speed in the vehicle backward direction to decrease.

When backward acceleration command threshold Vdl_th≤target vehicle speed differential Vd≤forward acceleration command threshold Vdh_th in the state S3R, the throttle aperture controlled variable Cth is maintained, and the current vehicle speed is maintained.

When a state wherein target vehicle speed differential Vd<backward acceleration command threshold Vdl_th continues, and the vehicle speed in the vehicle backward direction reaches a backward direction vehicle pushing vehicle speed upper limit Arv_Hth, in the state S3R, the throttle aperture controlled variable Cth is maintained, and the current vehicle speed is maintained.

Condition for Shifting from State S3R to State S2R

When a state wherein target vehicle speed differential Vd>forward acceleration command threshold Vdh_th continues, and the engine speed reaches the backward direction vehicle pushing partially-engaged clutch engine speed Arne_th, in the state S3R, there is a shift to the state S2R.

Condition for Shifting from State S3R to State S4 R

When a state wherein target vehicle speed differential Vd>forward acceleration command threshold Vdh_th continues, and the throttle aperture reaches the engaged clutch minimum throttle aperture Th_Lth owing to a decrease in the throttle aperture controlled variable Cth, but engine speed>backward direction vehicle pushing partially-engaged clutch engine speed Arne_th, in the state S3R, there is determined to be an uphill slope such that deceleration by braking is needed with respect to the vehicle speed in the backward vehicle direction, and there is a shift to the state S4R.

State S4R Control

In the state S4R, vehicle backward direction vehicle speed control is carried out by deceleration control using braking on an uphill slope.

While target vehicle speed differential Vd>forward acceleration command threshold Vdh_th in the state S4R, the braking controlled variable Cb is gradually caused to increase, increasing a braking amount, and thereby causing the vehicle speed in the vehicle backward direction to decrease.

When a state wherein target vehicle speed differential Vd<backward acceleration command threshold Vdl_th is reached in the state S4R, the braking controlled variable Cb is gradually caused to decrease, reducing the braking amount, and thereby causing the vehicle speed in the vehicle backward direction to increase.

When a state wherein backward acceleration command threshold Vdl_th≤target vehicle speed differential Vd≤forward acceleration command threshold Vdh_th is reached in the state S4R, the braking controlled variable Sb is maintained, and the current vehicle speed is maintained.

In a case of a vehicle in which no ABS is installed, the state at the time of shifting to the state S4R is maintained in the state S4R, and a state of a maximum deceleration wherein no braking is used is maintained.

Condition for Shifting from State S4R to State S3R

When a state wherein target vehicle speed differential Vd<backward acceleration command threshold Vdl_th continues, the braking controlled variable Cb decreases, and the braking amount reaches 0, in the state S4R, there is a shift to the state S3R.

Condition for Shifting to State S1

When the vehicle pushing assistance permission determination Aj is unfulfilled, or when the target vehicle pushing assistance vehicle speed Vt≥0, in the states S2R to S4R, there is a shift to the state S1, and vehicle pushing assistance in the vehicle backward direction is stopped. When shifting to the state S1, each controlled variable is adjusted in such a way that no sudden acceleration or deceleration occurs.

Although a detailed description is omitted in the first embodiment, not only the throttle aperture controlled variable Cth is calculated when controlling the engine speed, but also the fuel injection controlled variable Cf and the ignition timing controlled variable Cig are calculated in conjunction, and the engine speed is controlled by combining the throttle aperture, the amount of fuel injected, and the ignition timing.

The fuel injection control unit 62, the ignition timing control unit 63, and the electronically-controlled throttle control unit 64 output electrical signals that operate an injector 68, an ignition coil 69, and an electronically-controlled throttle 70 based on the fuel injection controlled variable Cf, the ignition timing controlled variable Cig, and the throttle aperture controlled variable Cth output from the vehicle pushing assistance unit 61, thereby controlling an engine output.

The electronically-controlled clutch control unit 65 and the electronically-controlled gearshift control unit 66 output electrical signals that operate an electronically-controlled clutch 71 and an electronically-controlled gearshift 72 based on the clutch controlled variable Cc and the gearshift controlled variable Cs output from the vehicle pushing assistance unit 61, thereby controlling the transmission 3. The ABS control unit 67 outputs an electrical signal based on the braking controlled variable Cb output from the vehicle pushing assistance unit 61, thereby controlling the front wheel brake 7 and the rear wheel brake 8.

According to the driving support device 50 according to the first embodiment configured as heretofore described, it is determined that there is an intention to push the vehicle based on a driver posture, and a determination of whether to permit vehicle pushing assistance is carried out based on the driver posture and a state of the vehicle 1, because of which the determination of whether to permit vehicle pushing assistance can be carried out appropriately in accordance with the driver posture. Also, the vehicle speed at which assistance is implemented can be adjusted in accordance with the driver posture, because of which the driver can push the vehicle 1 without moving a hand that supports the vehicle 1.

Second Embodiment

Next, a driving support device according to a second embodiment will be described. When describing the second embodiment, the description will be given using one portion of the drawings used in the description of the first embodiment.

The second embodiment relates to a device that, in a case of a vehicle having a motor as a power source, an automatic two-wheeled vehicle for example, carries out vehicle pushing assistance using a driver head portion position for an operation of causing the automatic two-wheeled vehicle to move via pushing by a driver, without using the motor.

Two means of pushing an automatic two-wheeled vehicle are conceivable, as described in the first embodiment. One is mounted vehicle pushing, carried out in a state wherein a driver straddles the automatic two-wheeled vehicle, as shown in FIG. 7, and the other is dismounted vehicle pushing, carried out by the driver dismounting from the automatic two-wheeled vehicle, standing on the left side of the automatic two-wheeled vehicle, placing a hand on the handlebar or the seat, and supporting the automatic two-wheeled vehicle, as shown in FIG. 9.

An automatic two-wheeled vehicle is structurally unable to stand erect, meaning that when pushing the vehicle, the driver needs to carry out a movement of the automatic two-wheeled vehicle or a handlebar operation while supporting the automatic two-wheeled vehicle, and a burden on the driver is considerable. This burden materializes still more noticeably when transporting a large automatic two-wheeled vehicle or moving on an inclined road by pushing. Furthermore, there are cases wherein vehicle pushing is carried out by utilizing engine power in a state wherein the clutch is partially engaged when moving uphill, which is a difficult operation for a driver who is unused to an automatic two-wheeled vehicle, as an accelerator operation and a clutch operation are involved.

A driving support device according to the second embodiment has an object of realizing a motor-based vehicle pushing assistance function that, in a situation wherein this kind of vehicle pushing is needed, is compatible with mounted pushing and dismounted pushing by using a driver head portion position, thereby lessening the vehicle pushing burden on the driver.

Hereafter, referring to the drawings, the second embodiment will be described in detail. In the same way as in the first embodiment, identical reference signs will be allotted to identical details and corresponding portions, and a detailed description thereof will be omitted.

Description of Configuration

FIG. 16 shows a left side view of an automatic two-wheeled vehicle (hereafter called the vehicle) according to the second embodiment, and FIG. 17 shows a right side view of the vehicle according to the second embodiment.

In FIGS. 16 and 17, the vehicle 1 is a saddled vehicle that travels by power generated by a motor 73, which functions as a power source, being transmitted to the rear wheel 5.

The front wheel brake 7 and the rear wheel brake 8, installed in the front wheel 6 and the rear wheel 5 respectively, include an electronically controllable system formed of the front wheel ABS 9 and the rear wheel ABS 10 respectively. The meter device 14, which displays information such as speed or distance, is included in a vicinity of the handlebar 13. The head portion position indicator 15 is installed in a helmet worn by a driver in order to detect the driver head portion position P, and the head portion position detector 16 is installed in the vehicle 1. Also, the accelerator 17 is included in the handlebar 13. The driver head portion position detecting device 18 is arranged below the meter device 14. The driver head portion position detecting device 18 may be disposed integrated with an ECU that carries out control of the motor 73 and the like. The gyro sensor 19, which can detect the roll angle, the pitch angle, and the yaw angle of the vehicle 1, is included in the center of the vehicle 1.

The driver head portion position detecting device 18 is configured of the head portion position indicator 15, the head portion position detector 16, and a travel direction head portion position detector 20 (refer to FIG. 18, to be described hereafter) that detects the driver head portion position P in the direction of travel of the vehicle 1. Wireless communication is carried out reciprocally between the head portion position indicator 15 and the head portion position detector 16, and the head portion position detector 16 transmits information relating to a positional relationship between the two to the travel direction head portion position detector 20. The head portion position indicator 15 is provided in a position on a central line passing through an apex portion of a helmet worn by the driver and a forehead. The head portion position detector 16 is provided in a vicinity of a central portion of the handlebar 13.

An instrument that has a distance measuring function and an angle measuring function in addition to a communication function can be used as the head portion position indicator 15 and the head portion position detector 16. Specifically, a Bluetooth communicator or a UWB communicator may be used. The travel direction head portion position detector 20 detects the driver head portion position P in the vehicle travel direction based on information relating to a radio wave angle of arrival and a radio wave intensity.

As illustrated in FIGS. 3 and 4 of the first embodiment, the driver head portion position P is configured of the distance Pd between the vehicle 1 and the driver, which is the distance from the head portion position indicator 15 on the vehicle 1 side to the head portion position detector 16 on the helmet side, and the driver head portion position angle Pθ detected from the positional relationship between the head portion position indicator 15 and the head portion position detector 16.

Also, in the same way as in the first embodiment, a multiple of head portion position detectors 16 may be included with respect to the head portion position indicator 15. This is because accurate position detection can be carried out using measurement that employs triangulation. Also, in this case, the head portion position detector 16 need not be disposed in a vicinity of the central portion of the handlebar 13. In this case too, it is desirable that a position is identified with a place on the vehicle 1 wherein comparison is easy, such as the central portion of the handlebar 13, as a reference. The position measuring method is not limited to radio waves. Position measurement may also be carried out from image information obtained from ultrasonic waves, a laser, or camera imaging.

Next, a driving support device according to the second embodiment will be described.

As a hardware configuration of a driving support device according to the second embodiment is the same as that in FIG. 5 described in the first embodiment, a description thereof will be omitted here, and a system configuration will be described next.

Description of System Configuration

FIG. 18 is a drawing showing a system configuration of the driving support device 50, and shows a system configuration of a vehicle pushing assistance function of the vehicle 1 having the motor 73 as a power source. The system is configured of the driver head portion position detecting device 18, which detects the driver head portion position P, the driving support device 50, which computes each controlled variable based on the driver head portion position P or vehicle information, and the motor 73, the front wheel ABS 9, and the rear wheel ABS 10, which are targets of control by the driving support device 50.

The driving support device 50, with the driver head portion position P output from the driver head portion position detecting device 18 and vehicle information as inputs, carries out a process to be described hereafter using a processing unit configured of the driver posture detecting unit 56, the mounting determining unit 57, the vehicle pushing assistance permission determining unit 58, the vehicle pushing intention determining unit 59, the target vehicle pushing assistance vehicle speed calculating unit 60, the vehicle pushing assistance unit 61, a motor control unit 74, and the ABS control unit 67, and realizes a vehicle pushing assistance function by controlling the motor 73, the front wheel ABS 9, and the rear wheel ABS 10.

The driver posture detecting unit 56, in the same way as in the first embodiment, calculates a detected value, that is, a forward leaning posture degree Pf indicating an extent to which the driver has a forward leaning posture with respect to the vehicle 1, as shown in FIG. 7, or a backward leaning posture as shown in FIG. 8, from the distance Pd between the vehicle 1 and the driver using the equation below.

Forward leaning posture degree Pf=reference mounted posture threshold Pd_th−distance Pd between vehicle 1 and driver.

When the relationship of the distance Pd between the vehicle 1 and the driver with respect to the reference mounted posture threshold Pd_th, which has the driver posture as a reference, when the vehicle 1 is stopped is such that the distance Pd between the vehicle 1 and the driver<the reference mounted posture threshold Pd_th, it is determined that the driver has a forward leaning posture, and the forward leaning posture degree Pf>0. Also, when the distance Pd between the vehicle 1 and the driver the reference mounted posture threshold Pd_th, it is determined that the driver has a backward leaning posture, and the forward leaning posture degree Pf<0.

The mounted head portion position of the driver when the vehicle is stopped may be learned in advance, and the reference mounted posture threshold Pd_th may be calculated based on the learned value, or the reference mounted posture threshold Pd_th may be parameter whose setting can be changed by an operation the driver. Also, separate reference mounted posture thresholds Pd_th for when mounted and when dismounted may be provided by using the driver mounting determination value Pr calculated by the mounting determining unit 57. A forward leaning posture and a backward leaning posture when dismounted are shown in FIGS. 9 and 10 respectively.

The mounting determining unit 57 determines whether the driver is mounted based on the driver head portion position P, and calculates the driver mounting determination value Pr. FIG. 11 shows a front view of the vehicle 1 when the driver is mounted and dismounted according to the mounting determining unit 57.

When the driver head portion position P is positioned within the normal mounted head portion position range Pr_rng, it is determined that the driver is in a vehicle mounting state of straddling the vehicle 1, and the driver mounting determination value Pr=1.

The normal mounted head portion position range Pr_rng is set to be a range of the driver head portion position P when the driver is mounted and pushing the vehicle. This means that in the present embodiment, wherein the driver head portion position P is configured of the driver head portion position angle Pθ and the distance Pd between the vehicle 1 and the driver, upper and lower limit values of the driver head portion position angle Pθ and the distance Pd between the vehicle 1 and the driver whereby it determined that the driver is mounted and pushing the vehicle form the normal mounted head portion position range Pr_rng. The upper and lower limit values fluctuate in accordance with the driver head portion position P.

When the driver head portion position P is positioned within the vehicle left side upright head portion position range Pl_rng, it is determined that the driver is in a vehicle left side upright state of being dismounted from the vehicle 1 and standing on the left side of the vehicle, and the driver mounting determination value Pr=2. The vehicle left side upright head portion position range Pl_rng is set to be a range of the driver head portion position P when dismounted and pushing the vehicle.

In the present embodiment, upper and lower limit values of the driver head portion position angle Pθ and the distance Pd between the vehicle 1 and the driver whereby it is determined that the driver is dismounted and pushing the vehicle form the vehicle left side upright head portion position range Pl_rng, in the same way as in the case of the normal mounted head portion position range Pr_rng. The upper and lower limit values fluctuate in accordance with the driver head portion position P.

When the driver head portion position P is not included in the normal mounted head portion position range Pr_rng or the vehicle left side upright head portion position range Pl_rng, the driver head portion position P is determined to be outside the vehicle pushing assistance range, and the driver mounting determination value Pr=0.

When the driver head portion position P is configured of information other than the driver head portion position angle Pθ and the distance Pd between the vehicle 1 and the driver, the normal mounted head portion position range Pr_rng and the vehicle left side upright head portion position range Pl_rng are determined in accordance with a setting of upper and lower limit values of each item of information. For example, in the case of a system wherein the driver head portion position P is calculated in accordance with three items of distance information from between a sensor installed in the apex portion of the helmet and sensors installed in three places in the vehicle 1, the normal mounted head portion position range Pr_rng and the vehicle left side upright head portion position range Pl_rng are determined from, upper and lower limit values set for each of the three items of distance information.

A mounted posture or a dismounted posture of the driver when the vehicle is stopped may be learned in advance, and the normal mounted head portion position range Pr_rng or the vehicle left side upright head portion position range Pl_rng may be calculated based on the learned value. Also, the normal mounted head portion position range Pr_rng and the vehicle left side upright head portion position range Pl_rng may be calculated based on driver body information input in advance by the driver.

Although the vehicle mounting state and the vehicle left side upright state are determined in accordance with the driver head portion position P in the present embodiment, another driver mounting determination system, such as a mounting determination using a pressure sensor attached to the vehicle seat, may be used.

The vehicle pushing intention determining unit 59 determines that the driver intends to implement a vehicle pushing, and determines an operation direction, based on information wherein the vehicle speed is added to the forward leaning posture degree Pf from the driver posture detecting unit 56, and outputs the vehicle pushing command value Ac.

When the forward leaning posture degree Pf exceeds the advancement intention threshold Af_th, and the vehicle speed in the forward direction is equal to or greater than the forward vehicle pushing implementation vehicle speed Afv_th, it is determined that the driver intends to advance by pushing the vehicle, and the vehicle pushing command value Ac is calculated from the Equation 1 described in the first embodiment to be such that vehicle pushing command value Ac>0.

The vehicle speed in the forward direction and the vehicle speed in the backward direction are calculated by combining travel direction information and vehicle speed information that does not include travel direction information. Travel direction information can be calculated by using a sensor or a system such as an acceleration sensor, a GPS, or image processing, and calculation means is not an issue. Vehicle speed information that does not include travel direction information is calculated using a vehicle speed sensor mounted on the front wheel or the rear wheel.

When the forward leaning posture degree Pt is less than the reversing intention threshold Ar_th, and the vehicle speed in the backward direction is equal to or greater than the backward vehicle pushing implementation vehicle speed Arv_th, it is determined that the driver intends to reverse by pushing the vehicle, and the vehicle pushing command value Ac is calculated from the Equation 2 described in the first embodiment to be such that vehicle pushing command value Ac>0.

When the forward leaning posture degree Pf, the vehicle speed in the forward direction, and the vehicle speed in the backward direction do not meet any of the aforementioned conditions, it is determined that the driver does not intend to advance or reverse by pushing the vehicle, and the vehicle pushing command value Ac=0.

The advancement intention threshold Af_th and the reversing intention threshold Ar_th are such that the thresholds are caused to fluctuate between when mounted and when dismounted using the driver mounting determination value Pr output from the mounting determining unit 57. Specifically, compared with when pushing the vehicle when mounted, fluctuation of the driver head portion position P is larger, and fluctuation of the forward leaning posture degree Pf is larger, when pushing the vehicle when dismounted, because of which the interval between the advancement intention threshold Af_th and the reversing intention threshold Ar_th is set to be larger when pushing the vehicle when dismounted, thereby preventing a malfunction of vehicle pushing assistance.

Also, a positional relationship between the vehicle and the driver head portion position P when not implementing a vehicle pushing, which forms a reference for posture determination, fluctuates in accordance with a vehicle inclination state, because of which a threshold manipulation that accords with the inclination state, such as setting each of the advancement intention threshold Af_th and the reversing intention threshold Ar_th to be larger when there is an upward inclination (the distance Pd between the vehicle 1 and the driver when normally mounted is small), as shown in FIG. 12, and setting each to be smaller when there is a downward inclination (the distance Pd between the vehicle 1 and the driver when normally mounted is large), as shown in FIG. 13, may be carried out.

The reason for not only the forward leaning posture degree Pf but also the vehicle speed coinciding with the direction in which the driver is pushing the vehicle being a trigger for starting vehicle pushing assistance in the vehicle pushing intention determining unit 59 is that vehicle pushing assistance unwanted by the driver is prevented by a start of vehicle pushing assistance being executed after the driver implementing vehicle pushing is detected.

Also, without using vehicle speed information as a trigger for starting vehicle pushing assistance, the trigger may be the forward leaning posture degree Pf alone. In this case, it is desirable that assistance mode switching means such as a switch is provided instead of vehicle speed information in order to elicit a driver's wish for assistance, and a determination that vehicle pushing assistance is to be started is implemented in accordance with assistance mode switching information from the assistance mode switching means. When implementing an assistance mode using a switch, an assistance mode switching switch is provided in the handlebar 13, and switching can be carried out between a normal mode, a forward vehicle pushing assistance mode, and a backward vehicle pushing assistance mode by an operation by the driver.

When selecting the forward vehicle pushing assistance mode, the vehicle pushing command value Ac is calculated using the aforementioned Equation 1 when forward leaning posture degree Pf>advancement intention threshold Af_th is fulfilled. Also, when selecting the backward vehicle pushing assistance mode, the vehicle pushing command value Ac is calculated using the aforementioned Equation 2 when forward leaning posture degree Pf<reversing intention threshold Ar_th is fulfilled. When selecting the normal mode, the vehicle pushing command value Ac=0.

Vehicle pushing assistance using a switch is more effective than vehicle pushing assistance having vehicle speed information as a trigger when utilized on a steep uphill slope or a steep downhill slope. When implementing vehicle pushing assistance having vehicle speed information as a trigger on a steep uphill slope or a steep downhill slope, the following kinds of problem occur.

1. When a force in the backward direction caused by gravity is large with respect to power of the driver to push the vehicle in the forward direction on a steep uphill slope, there is no vehicle speed in the forward direction, and vehicle pushing assistance cannot be started.

2. The vehicle moves forward against the intention of the driver due to a force in the forward direction caused by gravity on a steep downhill slope, and vehicle pushing assistance malfunctions. A situation wherein vehicle pushing assistance cannot be operated as the driver intends in this way occurs prominently in a case of a large vehicle of a heavy weight, wherein vehicle pushing assistance is more necessary.

In response to this, vehicle pushing assistance using a switch is such that vehicle pushing assistance implemented in accordance with the assistance mode selected using the switch and the driver head portion position P, because of which the problems in the aforementioned situations are resolved.

The target vehicle pushing assistance vehicle speed calculating unit 60 converts the vehicle pushing command value Ac from the vehicle pushing intention determining unit 59 into the target vehicle pushing assistance vehicle speed Vt. The target vehicle pushing assistance vehicle speed Vt is calculated using a target vehicle pushing assistance vehicle speed conversion factor, as in the following equation.

Target vehicle pushing assistance vehicle speed Vt=target vehicle pushing assistance vehicle speed conversion factor (vehicle pushing command value Ac).

When target vehicle pushing assistance vehicle speed Vt>0, the vehicle 1 is to be assisted in the forward direction. When target vehicle pushing assistance vehicle speed Vt<0, the vehicle 1 is to be assisted in the backward direction. When target vehicle pushing assistance vehicle speed Vt=0, vehicle pushing assistance is to be stopped.

Although the target vehicle pushing assistance vehicle speed Vt is determined based on the vehicle pushing command value Ac, using a target vehicle pushing assistance vehicle speed conversion factor, a relationship between the vehicle pushing command value Ac and the target vehicle pushing assistance vehicle speed Vt may be set freely in accordance with a form of the vehicle or an assumed driver competency.

For example, when the vehicle pushing command value Ac is other than 0, the relationship can be limited to switching between implementing vehicle pushing assistance and stopping assistance in accordance with a driver posture by setting the vehicle pushing assistance vehicle speed to be an arbitrary unique vehicle speed, in order that vehicle pushing assistance becomes effective in a case of a driver posture such that the vehicle pushing command value Ac is other than 0, and vehicle pushing assistance is stopped in a case of a driver posture such that the vehicle pushing command value Ac is 0. By so doing, a stable vehicle pushing can be assisted even when the driver posture unintentionally changes during vehicle pushing.

Also, by providing arbitrary thresholds with respect to the vehicle pushing command value Ac, and setting each target vehicle pushing assistance vehicle speed Vt in accordance with a threshold range, the vehicle speed can be adjusted in accordance with the posture degree in the same way that the driver adjusts the vehicle speed using an accelerator operation. Furthermore, a multiple of assistance modes selectable by the driver may be provided, and target vehicle pushing assistance vehicle speeds Vt that differ in accordance with the selected mode may be output, even when the vehicle pushing command value Ac is the same.

The vehicle pushing assistance permission determining unit 58 determines, based on the driver head portion position P and a vehicle state, whether the vehicle state is such that vehicle pushing assistance can be implemented appropriately.

When the driver head portion position P is outside a predetermined value range, the vehicle pushing assistance permission determination Aj is unfulfilled, and vehicle pushing assistance is prohibited. This is in order to prevent a state wherein the distance between the driver and the vehicle becomes too great during vehicle pushing assistance, or to prevent vehicle pushing assistance at an unusual posture.

A determination based on the vehicle state is such that when the front wheel 6 or the rear wheel 5 speed exceeds a predetermined value, when the accelerator aperture exceeds a predetermined value, when a motor speed exceeds a predetermined value, when the kickstand is not stored, when the roll angle of the vehicle 1 exceeds a predetermined value, and the like, the vehicle pushing assistance permission determination Aj unfulfilled, and vehicle pushing assistance is prohibited.

Conditions for prohibiting vehicle pushing assistance may be provided separately for before implementing vehicle pushing assistance and during implementation. When the condition for the vehicle pushing assistance permission determination Aj being unfulfilled is not fulfilled, the vehicle pushing assistance permission determination Aj is fulfilled, and an implementation of vehicle pushing assistance is permitted.

The vehicle pushing assistance unit 61 is such that a controlled variable for each actuator (a motor controlled variable Cm and the braking controlled variable Cb) is computed in accordance with the target vehicle pushing assistance vehicle speed Vt and the current vehicle state, and vehicle speed feedback control with respect to the target vehicle pushing assistance vehicle speed Vt is implemented.

The target vehicle speed differential Vd is calculated from the target vehicle pushing assistance vehicle speed Vt and the current vehicle speed Vr as in the following equation.

$$Vd = Vt - Vr$$

A vehicle speed including travel direction information is used as the current vehicle speed Vr, and the current vehicle speed Vr is taken to be a vehicle speed in the forward direction when current vehicle speed Vr>0, and a vehicle speed in the backward direction when current vehicle speed Vr<0.

FIGS. 19 and 20 show state shift drawings for controlling vehicle pushing assistance in the forward direction and controlling vehicle pushing assistance in the backward direction respectively in the second embodiment. An initial state is a state S1m, and the state S1m is a state wherein vehicle pushing assistance is not implemented.

Forward Direction Vehicle Pushing Assistance Control Condition for Shifting from State S1m to State S2m As shown in FIG. 19, there is a shift to a state S2m when the vehicle pushing assistance permission determination Aj is fulfilled, and target vehicle pushing assistance vehicle speed Vt>0 is fulfilled, in the state S1m.

State S2m Control

In the state S2m, an inclined state for which motor forward direction torque is needed in order to cause the vehicle 1 to advance is assumed, and vehicle speed control is carried out by controlling motor torque. While target vehicle speed differential Vd>forward acceleration command threshold Vdh_th in the state S2m, the motor controlled variable Cm is manipulated in such a way as to gradually cause torque to increase in the motor forward direction, thereby causing the vehicle speed in the vehicle forward direction to increase. The motor controlled variable Cm is a controlled variable for controlling the torque of the motor 73, and the motor 73 operates in forward, reverse, regenerative braking, and stopped states based on the motor controlled variable Cm.

When target vehicle speed differential Vd<backward acceleration command threshold Vdl_th in the state S2m, the motor controlled variable Cm is manipulated in such a way as co gradually cause torque to decrease in the motor forward direction, thereby causing the vehicle speed in the vehicle forward direction to decrease.

When backward acceleration command threshold Vdl_th≤target vehicle speed differential Vd≤d forward acceleration command threshold Vdh_th in the state S2m, the motor controlled variable Cm is maintained, and the current vehicle speed is maintained.

When a state wherein target vehicle speed differential Vd>forward acceleration command threshold Vdh_th continues, and the vehicle speed in the vehicle forward direction reaches the forward direction vehicle pushing vehicle speed upper limit Afv_Hth, in the state S2m, the motor controlled variable Ctm is maintained, and the current vehicle speed is maintained.

When the target vehicle pushing assistance vehicle speed Vt decreases considerably, and a state wherein target vehicle speed differential Vd<forward direction vehicle pushing braking intervention threshold Afvb_th is reached, in the state S2m, it is determined that there is a vehicle speed reduction request for which a braking intervention is needed, and deceleration by braking may be carried out by manipulating the braking controlled variable Cb in accordance with the target vehicle speed differential Vd. Setting is carried out in such a way that forward direction vehicle pushing braking intervention threshold Afvb_th<0. Also, the motor controlled variable Cm may be manipulated instead of braking, and deceleration by regenerative braking or reverse braking carried out, or control may be carried out by a combination thereof.

Condition for Shifting from State S2m to State S3m

When a state wherein target vehicle speed differential Vd<backward acceleration command threshold Vdl_th continues, and the motor forward direction torque is 0 or less owing to manipulation of the motor controlled variable Cm, in the state S2m, there is determined to be a downhill slope necessitating deceleration by braking, and there is a shift to a state S3m.

When an amount of inclination detected by the gyro sensor 19 is equal to or less than a predetermined value, or when a deceleration in the vehicle forward direction is small with respect to a deceleration in the motor forward direction torque when target vehicle speed differential Vd>backward acceleration command threshold Vdl_th, in the state S2m, there is determined to be a steep downhill slope, and an immediate shift may be made to the state S3m.

When the inclination amount is oriented in the vehicle forward direction from the vehicle 1, the inclination amount is an amount forming a positive value in a case of an uphill slope, and an amount forming a negative value in a case of a downhill slope. The greater the inclination, the greater the absolute value of the inclination amount.

State S3m Control

In the state S3m, vehicle speed control is carried out by deceleration control using braking on a downhill slope.

While target vehicle speed differential Vd<backward acceleration command threshold Vdl_th in the state S3m, the braking controlled variable Cb is gradually caused to increase, increasing a braking amount, and thereby causing the vehicle speed in the vehicle forward direction to decrease. When a state wherein target vehicle speed differential Vd>forward acceleration command threshold Vdh_th is reached in the state S3m, the braking controlled variable Cb is gradually caused to decrease, reducing the braking amount, and thereby causing the vehicle speed in the vehicle forward direction to increase.

When a state wherein backward acceleration command threshold Vdl_th≤target vehicle speed differential Vd≤forward acceleration command threshold Vdh_th is reached in the state S3m, the braking controlled variable Cb is maintained, and the current vehicle speed is maintained.

In the state S3, the motor controlled variable Cm may be manipulated instead of braking, and deceleration control by regenerative braking or reverse braking may be carried out, or control may be carried out by a combination thereof. In a case of the vehicle 1 in which no ABS is installed, the motor controlled variable Cm is manipulated instead of braking, and deceleration control by regenerative braking or reverse braking is carried out, in the state S3m.

Condition for Shifting from State S3m to State S2m

When a state wherein target vehicle speed differential Vd>forward acceleration command threshold Vdh_th continues, the braking controlled variable Cb decreases, and the braking amount reaches 0, in the state S3m, there is a shift to the state S2m.

Condition for Shifting to State S1m

When the vehicle pushing assistance permission determination Aj is unfulfilled, or when a state wherein target vehicle pushing assistance vehicle speed Vt≤0 is reached, in the states S2m and S3m, there is a shift to the state S1m, and vehicle pushing assistance in the vehicle forward direction is stopped. When shifting to the state S1m, each controlled variable is adjusted in such a way that no sudden acceleration or deceleration occurs.

Backward Direction Assistance Control.

Condition for Shifting from State S1m to State S2mR

As shown in 20, there is a shift to a state S2mR when the vehicle pushing assistance permission determination Aj is fulfilled, and target vehicle pushing assistance vehicle speed Vt<0 is fulfilled, in the state S1m.

State S2mR Control.

In the state S2mR, an inclined state for which motor reverse direction torque is needed in order to cause the vehicle 1 to advance is assumed, and vehicle speed control is carried out by controlling motor torque.

While target vehicle speed differential Vd<backward acceleration command threshold Vdl_th in the state S2mR, the motor controlled variable Cm is manipulated in such a way as to gradually cause torque to increase in the motor reverse direction, thereby causing the vehicle speed in the vehicle backward direction to increase.

When a state wherein target vehicle speed differential Vd>forward acceleration command threshold Vdh_th is reached in the state S2mR, the motor controlled variable Cm is manipulated in such a way as to gradually cause torque to decrease in the motor reverse direction, thereby causing the vehicle speed in the vehicle backward direction to decrease.

When a state wherein backward acceleration command threshold Vdl_th≤target vehicle speed differential Vd≤forward acceleration command threshold Vdh_th is reached in the state S2mR, the motor controlled variable Cm is maintained, and the current vehicle speed is maintained.

When a state wherein target vehicle speed differential Vd<backward acceleration command threshold Vdl_th continues, and the vehicle speed in the vehicle backward direction reaches the backward direction vehicle pushing vehicle speed upper limit Arv_Hth, in the state S2mR, the motor controlled variable Cm is maintained, and the current vehicle speed is maintained.

Condition for Shifting from State S2mR to State S3mR

When a state wherein target vehicle speed differential Vd>forward acceleration command threshold Vdh_th continues, and the motor reverse direction torque is 0 or greater owing to manipulation of the motor controlled variable Cm, in the state S2mR, there is determined to be a downhill slope necessitating deceleration by braking with respect to the vehicle speed in the backward vehicle direction, and there is a shift to a state S3mR.

When an amount of inclination detected by the gyro sensor 19 is equal to or greater than a predetermined value, or when a deceleration in the vehicle backward direction is small with respect to a decrease in the motor reverse direction torque when target vehicle speed differential Vd>forward acceleration command threshold Vdh_th, in the state S2mR, there is determined to be a steep uphill slope, and an immediate shift may be made to the state S3mR.

State S3mR Control

In the state S3mR, vehicle backward direction speed control is carried out by deceleration control using braking on an uphill slope. While target vehicle speed differential Vd>forward acceleration command threshold Vdh_th in the state S3mR, the braking controlled variable Cb is gradually caused to increase, increasing a braking amount, and thereby causing the vehicle speed in the vehicle backward direction to decrease.

When a state wherein target vehicle speed differential Vd>backward acceleration command threshold Vdl_th is reached in the state S3mR, the braking controlled variable Cb is gradually caused to decrease, reducing the braking amount, and thereby causing the vehicle speed in the vehicle backward direction to increase.

When a state wherein backward acceleration command threshold Vdl_th≤target vehicle speed differential Vd≤forward acceleration command threshold Vdh_th is reached in the state S3mR, the braking controlled variable Cb is maintained, and the current vehicle speed is maintained.

In the state S3mR, the motor controlled variable Cm may be manipulated instead of braking, and deceleration control by regenerative braking or reverse braking may be carried out, or control may be carried out by a combination thereof. In a case of the vehicle 1 in which no ABS is installed, the motor controlled variable Cm is manipulated instead of braking, and deceleration control by regenerative braking or reverse braking is carried out, in the state S3mR.

Condition for Shifting from State S3mR to State S2mR

When a state wherein target vehicle speed differential Vd<backward acceleration command threshold Vdl_th continues, the braking controlled variable Cb decreases, and the braking amount reaches 0, in the state S3mR, there is a shift to the state S2mR.

Condition for Shifting to State S1m

When the vehicle pushing assistance permission determination Aj is unfulfilled, or when the target vehicle pushing assistance vehicle speed Vt≤0, in the states S2mR and S3mR, there is a shift to the state S1m, and vehicle pushing assistance in the vehicle backward direction is stopped. When shifting to the state S1m, each controlled variable is adjusted in such a way that no sudden acceleration or deceleration occurs.

The motor control unit 74 outputs an electrical signal to the motor 73 or an inverter for motor control based on the motor controlled variable Cm output from the vehicle pushing assistance unit 61, thereby controlling a motor drive. The ABS control unit 67 outputs an electrical signal based on the braking controlled variable Cb output from the vehicle pushing assistance unit 61, thereby controlling the front wheel ABS 9 and the rear wheel ABS 10.

In the same way as in the first embodiment, the driving support device 50 according to the second embodiment configured as heretofore described is also such that it is determined that there is an intention to push the vehicle based on a driver posture, and a determination of whether to permit vehicle pushing assistance is carried out based on the driver posture and a state of the vehicle 1, because of which the determination of whether to permit vehicle pushing assistance can be carried out appropriately in accordance with the driver posture. Also, the vehicle speed at which assistance is implemented can be adjusted in accordance with the driver posture, because of which the driver can push the vehicle 1 without moving a hand that supports the vehicle 1.

The driving support device 50 according to the present application, not being limited to an automatic two-wheeled vehicle, can be applied to various kinds of vehicle, such as a saddled three or four-wheeled vehicle. Also, the driving support device 50 according to the present application can also be applied to a hybrid vehicle wherein the first embodiment and the second embodiment are combined.

Although the present application is described above in terms of various exemplifying embodiments and implementations, it should be understood that the various features, aspects, and functions described in one or more of the individual embodiments are not limited in their applicability to the particular embodiment with which they are described, but instead can be applied, alone or in various combinations, to one or more other embodiments.

It is therefore understood that numerous modifications that have not been exemplified can be devised without departing from the scope of the present application. For example, at least one constituent component may be modified, added, or eliminated. At least one of the constituent components mentioned in at least one of the preferred embodiments may be selected and combined with the constituent components mentioned in another preferred embodiment.

What is claimed is:

1. A driving support device, comprising:
    a driver posture detecting circuitry that detects a posture of a driver based on a driver head portion position output from a driver head portion position detecting device;
    a vehicle pushing intention determining circuitry that determines, based on a detected value obtained by the driver posture detecting circuitry, that there is a state wherein a vehicle is being pushed by the driver, and outputs a vehicle pushing command value;
    a target vehicle pushing assistance vehicle speed calculating circuitry that calculates a target vehicle pushing assistance vehicle speed by converting the vehicle pushing command value;
    a vehicle pushing assistance permission determining circuitry that determines whether vehicle pushing assistance can be implemented based on the posture of the driver and a state of the vehicle, and outputs a vehicle pushing assistance permission determination; and
    a vehicle pushing assistance circuitry that calculates, from the target vehicle pushing assistance vehicle speed and the vehicle pushing assistance permission determination, a controlled variable for a vehicle power source that assists vehicle pushing, and outputs the controlled variable,
    wherein the vehicle pushing intention determining circuitry calculates the vehicle pushing command value to be a value greater than zero based on the detected value obtained by the driver posture detecting circuitry exceeding an advancement intention threshold and a speed of the vehicle in a forward direction being equal to or greater than a forward vehicle pushing implementation vehicle speed, and calculates the vehicle pushing command value to be a value less than zero based on the detected value obtained by the driver posture detecting circuitry being less than a reversing intention threshold and a speed of the vehicle in a backward direction being equal to or greater than a backward vehicle pushing implementation vehicle speed.

2. The driving support device according to claim 1, wherein the driver posture detecting circuitry detects the detected value of the posture of the driver based on a distance between the vehicle and the driver and a reference mounted posture threshold having a driver posture as a reference.

3. The driving support device according to claim 2, wherein the driver head portion position detecting device includes a head portion position indicator installed in a helmet worn by the driver, a head portion position detector that is attached to the vehicle and detects a signal from the head portion position indicator, and a travel direction head portion position detector that detects a head portion position of the driver from a radio wave angle of arrival and a radio wave intensity between the head portion position indicator and the head portion position detector.

4. The driving support device according to claim 1, wherein the driver head portion position detecting device includes a head portion position indicator installed in a helmet worn by the driver, a head portion position detector that is attached to the vehicle and detects a signal from the head portion position indicator, and a travel direction head portion position detector that detects a head portion position of the driver from a radio wave angle of arrival and a radio wave intensity between the head portion position indicator and the head portion position detector.

5. The driving support device according to claim 1, further comprising a mounting determining circuitry that determines whether the driver is mounted on the vehicle, and calculates a driver mounting determination value, wherein the vehicle pushing intention determining circuitry calculates the vehicle pushing command value by comparing the detected value obtained by the driver posture detecting circuitry with a threshold value,
    wherein the vehicle pushing intention determining circuitry uses a first value as the threshold value based on the driver mounting determination value indicating that the driver is mounted on the vehicle and uses a second value, different from the first value, as the threshold value based on the driver mounting determination value indicating that the driver is not mounted on the vehicle.

6. The driving support device according to claim 1,
    wherein the driver posture detecting circuitry detects the detected value of the posture of the driver based on a distance between the vehicle and the driver and a reference mounted posture threshold having a driver posture as a reference
    wherein the driving support device further comprises a mounting determining circuitry that determines whether the driver is mounted on the vehicle, and calculates a driver mounting determination value, wherein the vehicle pushing intention determining circuitry calculates the vehicle pushing command value by comparing the detected value obtained by the driver posture detecting circuitry with a threshold value, and wherein the vehicle pushing intention determining circuitry uses a first value as the threshold value based on the driver mounting determination value indicating that the driver is mounted on the vehicle and uses a second value, different from the first value, as the threshold value based on the driver mounting determination value indicating that the driver is not mounted on the vehicle.

7. The driving support device according to claim 6, wherein the target vehicle pushing assistance vehicle speed calculating circuitry switches between activating and deactivating assistance vehicle speed calculation in accordance with the posture of the driver when the posture of the driver changes while pushing the vehicle.

8. The driving support device according to claim 6, wherein the vehicle power source is an internal combustion engine.

9. The driving support device according to claim 8, wherein the vehicle pushing assistance circuitry calculates controlled variables of an amount of fuel injected into the internal combustion engine, a fuel injection timing, and an ignition timing, and of an air volume regulating valve that regulates an intake air volume.

10. The driving support device according to claim 6, wherein the vehicle power source is a motor.

11. The driving support device according to claim 10, wherein the vehicle pushing assistance circuitry controls an output torque of the motor.

12. The driving support device according to claim 1, wherein the target vehicle pushing assistance vehicle speed calculating circuitry switches between activating and deactivating assistance vehicle speed calculation in accordance with the posture of the driver when the posture of the driver changes while pushing the vehicle.

13. The driving support device according to claim 1, wherein the vehicle power source is an internal combustion engine.

14. The driving support device according to claim 13, wherein the vehicle pushing assistance circuitry calculates controlled variables of an amount of fuel injected into the internal combustion engine, a fuel injection timing, and an ignition timing, and of an air volume regulating valve that regulates an intake air volume.

15. The driving support device according to claim 1, wherein the vehicle power source is a motor.

16. The driving support device according to claim 15, wherein the vehicle pushing assistance circuitry controls an output torque of the motor.

* * * * *